(12) United States Patent
Aoki et al.

(10) Patent No.: US 7,097,366 B2
(45) Date of Patent: Aug. 29, 2006

(54) METHOD FOR PRODUCTION OF OPTICAL MODULE AND OPTICAL MODULE

(75) Inventors: Tsuyoshi Aoki, Kawasaki (JP); Masayuki Kato, Kawasaki (JP); Yasuo Yamagishi, Kawasaki (JP); Tomoyuki Akahoshi, Kawasaki (JP); Nawalage Florence Cooray, Kawasaki (JP); Mamoru Kurashina, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/990,983

(22) Filed: Nov. 18, 2004

(65) Prior Publication Data

US 2005/0069274 A1    Mar. 31, 2005

Related U.S. Application Data

(63) Continuation of application No. PCT/JP03/006034, filed on May 14, 2003.

(30) Foreign Application Priority Data

Jun. 6, 2002    (JP) ............................ 2002-166026

(51) Int. Cl.
   *G02B 6/36* (2006.01)
(52) U.S. Cl. ............................. 385/92; 385/53; 385/88
(58) Field of Classification Search .................. 385/88, 385/89, 90, 91, 92
   See application file for complete search history.

(56) References Cited

FOREIGN PATENT DOCUMENTS

JP    2002-075488 A    3/2002

OTHER PUBLICATIONS

Patent Abstracts of Japan, No. 05-264831, dated Oct. 15, 1993. Cited in the int'l. search report.
Patent Abstracts of Japan, No. 06-160495, dated Jun. 7, 1994. Cited in the int'l. search report.
Patent Abstracts of Japan, No. 09-211273, dated Aug. 15, 1997. Cited in the int'l. search report.
Patent Abstracts of Japan, No. 05-119230, dated May 18, 1993. Cited in the int'l. search report.
Patent Abstracts of Japan, No. 07-134220, dated May 23, 1995. Cited in the int'l. search report.
Patent Abstracts of Japan, No. 2001-330762, dated Nov. 30, 2001. Cited in the specification.

*Primary Examiner*—Jennifer Doan
(74) *Attorney, Agent, or Firm*—Westerman, Hattori, Daniels & Adrian, LLP.

(57) ABSTRACT

An optoelectronic component is mounted at a precise position on a waveguide substrate so as to reduce loss in propagating light, and electrically connect electrodes on the waveguide substrate and the optoelectronic component. The waveguide substrate has an optical waveguide and a recessed portion for mounting the optoelectronic component, and electrodes are arranged on the recessed portion. A great number of globular elastic conductive particles are distributed on the bottom surface of the recessed portion. Thereafter, the optoelectronic component is placed in the recessed portion so as to press the globular elastic conductive particles, and alignment between the optical waveguide in the waveguide substrate and an optical waveguide in the optoelectronic component is adjusted. Then, the optoelectronic component is fixed to the waveguide substrate with an optical adhesive while the alignment is precisely adjusted.

23 Claims, 27 Drawing Sheets

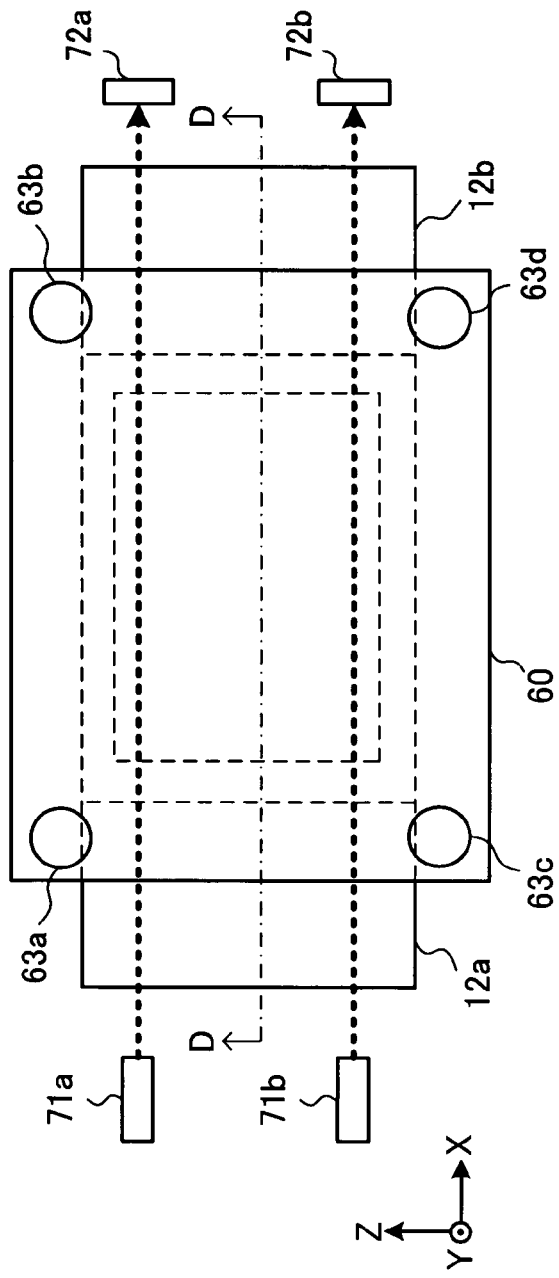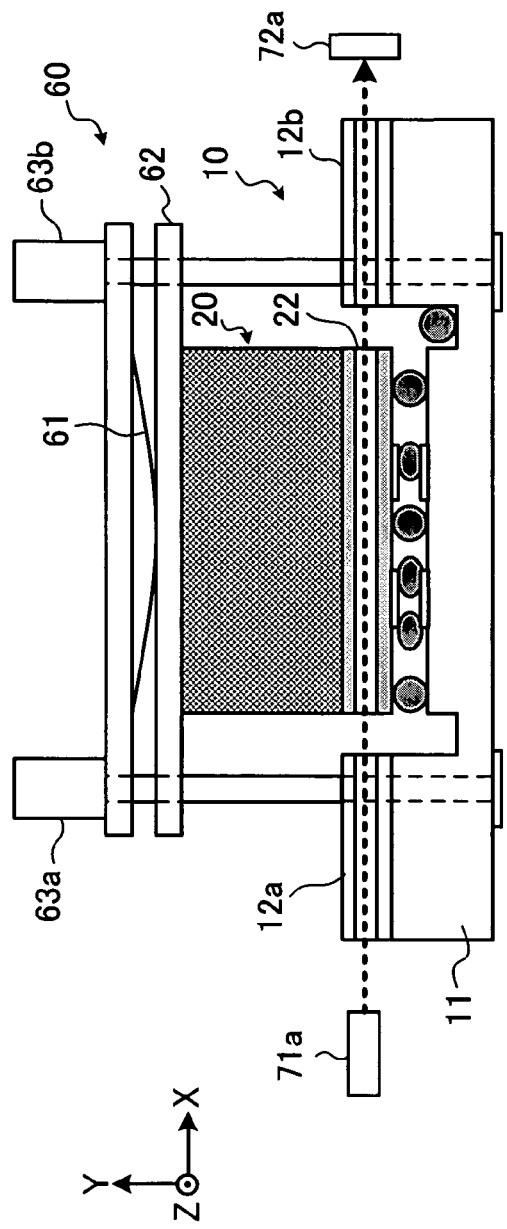
FIG. 8A
FIG. 8B

METHOD FOR PRODUCTION OF OPTICAL MODULE AND OPTICAL MODULE

CROSS-REFERENCE TO RELATED APPLICATIONS

This application is a continuing application, filed under 35 U.S.C. Section 111(a), of International Application PCT/JP03/06034, filed May 14, 2003, it being further noted that priority is based upon Japanese Patent Application No. 2002-166026, filed Jun. 6, 2002.

BACKGROUND OF THE INVENTION

1) Field of the Invention

The present invention relates to an optical module in which an optoelectronic component is mounted on a waveguide substrate, and a method for production of such an optical module. In particular, the present invention relates to a method for production of an optical module according to which an optoelectronic component can be precisely aligned with an optical waveguide on a waveguide substrate, and an optical module in which an optoelectronic component can be precisely aligned with an optical waveguide on a waveguide substrate.

2) Description of the Related Art

In recent years, development of optical communication systems which can transmit and receive signals of large capacities has been proceeding. In particular, in the optical modules for realizing switching, optical multiplexing and demultiplexing, photoelectric conversion, or the like of optical signals, increase in manufacturing efficiency is required as well as improvement in optoelectronic components and waveguides contained in the optical modules.

The optical modules are produced, for example, by forming an optical waveguide made of quartz or a resin-based material on a substrate made of Si or the like, and mounting an optoelectronic component such as an optical deflection element on a surface on which the optical waveguide is formed. In order to minimize optical loss in light which propagates between the optical waveguide on the substrate and the optoelectronic component in such optical modules, it is necessary to precisely align the optical axes of the optical waveguide on the substrate and the optoelectronic component with each other. In particular, in the case of the single-mode optical waveguide, which is generally used in optical communication systems, highly precise alignment of optical axes with precision of submicron order is required.

Generally, when an optical waveguide is formed on a quartz substrate, it is difficult to precisely control the core height above a surface of the substrate. Therefore, it is necessary to achieve precise alignment when an optoelectronic component is mounted. In order to address this problem, a mounting method which can control the height of an optoelectronic component above a substrate has been proposed (see, for example, Japanese Unexamined Patent Publication No. 2001-330762). According to the proposed mounting method, a great number of globular quartz spacers are deposited on a mounting surface of a substrate on which an optoelectronic component is to be mounted, and the optoelectronic component is placed on the globular quartz spacers, and fixed with an adhesive. In this case, it is possible to adjust the height of the optoelectronic component mounted on the substrate, according to the diameter of the globular spacers.

SUMMARY OF THE INVENTION

According to the present invention, a method for production of an optical module is provided. In the optical module, an optoelectronic component having at least one first electrode on a bottom surface of the optoelectronic component is mounted on a waveguide substrate having an optical waveguide, a recessed portion, and at least one second electrode formed on the recessed portion in correspondence with said at least one first electrode. The method comprises the steps of: (a) distributing globular elastic conductive particles on a bottom surface of the recessed portion of the waveguide substrate and at least one upper surface of the at least one second electrode; (b) placing the optoelectronic component in the recessed portion of the waveguide substrate so that the at least one first electrode is respectively opposed to the at least one second electrode through at least a portion of the globular elastic conductive particles which is located on the at least one upper surface of the at least one second electrode; (c) adjusting alignment between the optoelectronic component and the waveguide substrate by pressing the optoelectronic component toward the waveguide substrate so that the at least one first electrode is respectively electrically connected to the at least one second electrode through at least one portion of the globular elastic conductive particles; and (d) fixing the optoelectronic component to the waveguide substrate so that the optoelectronic component is aligned with the waveguide substrate.

According to the above method for production of an optical module, the optoelectronic component is placed in the recessed portion of the waveguide substrate through the globular elastic particles. When the optoelectronic component placed in the recessed portion is pressed, the globular elastic particles deform, so that it is possible to finely adjust the height of the optoelectronic component above the waveguide substrate and the angle which the optoelectronic component makes with the waveguide substrate. In addition, since the globular elastic particles are conductive, and distributed in the recessed portion, the at least one first electrode on the waveguide substrate and the at least one second electrode on the optoelectronic component which respectively correspond to each other are electrically connected through the globular elastic particles.

In addition, according to the present invention, an optical module in which an optoelectronic component is mounted on a waveguide substrate is provided. The optical module comprises: a recessed portion formed on the waveguide substrate for placing the optoelectronic component; at least one first electrode arranged on a bottom surface of the recessed portion; at least one second electrode arranged on a bottom surface of the optoelectronic component in correspondence with the at least one first electrode; and globular elastic conductive particles distributed on the bottom surface of the recessed portion and an upper surface of the at least one first electrode. In the above optical module, the optoelectronic component is fixed to the waveguide substrate in such a manner that the optoelectronic component presses the globular elastic conductive particles.

According to the above optical module, the optoelectronic component is placed in the recessed portion of the waveguide substrate through the globular elastic particles. When the optoelectronic component placed in the recessed portion is pressed, the globular elastic particles deform, so that the height of the optoelectronic component above the waveguide substrate and the mounting angle of the optoelectronic component can be finely adjusted. In addition, since the globular elastic particles are conductive, and distributed in the recessed portion, the at least one first electrode on the waveguide substrate and the at least one second electrode on the optoelectronic component which respectively correspond to each other are electrically connected through the globular elastic particles.

Further, according to the present invention, a method for production of an optical module is provided. In the optical module, an optoelectronic component having at least one first electrode on a bottom surface of the optoelectronic component is mounted on a waveguide substrate having an optical waveguide and at least one second electrode which is respectively formed in correspondence with the at least one first electrode. The method comprises the steps of: (a) concentratedly depositing globular elastic conductive particles on and around the at least one second electrode; (b) placing the optoelectronic component on the globular elastic conductive particles so that the at least one first electrode is respectively opposed to the at least one second electrode, and at least one portion of the globular elastic conductive particles is located between the at least one first electrode and the at least one second electrode; (c) adjusting alignment between the optoelectronic component and the waveguide substrate by pressing the optoelectronic component toward the waveguide substrate so that the first and second electrodes are electrically connected through at least one portion of the globular elastic conductive particles; and (d) fixing the optoelectronic component to the waveguide substrate so that the optoelectronic component is aligned with the waveguide substrate.

In the above method for production of an optical module, the globular elastic conductive particles are concentratedly deposited on and around the at least one second electrode of the waveguide substrate, for example, by forming steps between adjacent ones of the at least one second electrode (when the number of the at least one second electrode is more than one), or applying an adhesive to the at least one second electrode and at least one vicinity of the at least one second electrode. Thereby, when the optoelectronic component is fixed to the waveguide substrate, the at least one first electrode on the optoelectronic component and the at least one second electrode on the waveguide substrate can be respectively electrically connected through the globular elastic conductive particles with higher reliability.

Furthermore, according to the present invention, a method for production of an optical module is provided. In the optical module, an optoelectronic component having at least one first electrode on a bottom surface of the optoelectronic component is mounted on a waveguide substrate having an optical waveguide and at least one second electrode which is respectively formed in correspondence with the at least one first electrode. The method comprises the steps of: (a) forming a mask which protects the waveguide substrate except for the at least one second electrode and at least one vicinity of the at least one second electrode; (b) applying a first adhesive containing globular elastic conductive particles to the waveguide substrate on which said mask is formed; (c) removing the mask; (d) applying a second adhesive to the waveguide substrate; (e) placing the optoelectronic component on the waveguide substrate so that the at least one first electrode is respectively opposed to the at least one second electrode, and at least one portion of the globular elastic conductive particles is located between the first and second electrodes; (f) adjusting alignment between the optoelectronic component and the waveguide substrate by pressing the optoelectronic component toward the waveguide substrate so that the first and second electrodes are electrically connected through at least one portion of the globular elastic conductive particles; and (g) fixing the optoelectronic component to the waveguide substrate by curing the first and second adhesives so that the optoelectronic component is aligned with the waveguide substrate.

In the above method for production of an optical module, since the first adhesive containing the globular elastic conductive particles can be selectively applied to the at least one second electrode and at least one vicinity of the at least one second electrode of the waveguide substrate, the globular elastic conductive particles can be concentratedly deposited on and around the at least one second electrode. Thereby, the at least one first electrode on the optoelectronic component and the at least one second electrode on the waveguide substrate can be respectively electrically connected through the globular elastic conductive particles with higher reliability.

The above and other features and advantages of the present invention will become apparent from the following description when taken in conjunction with the accompanying drawings which illustrate preferred embodiment of the present invention by way of example.

BRIEF DESCRIPTION OF THE DRAWINGS

FIGS. 8A and 8B are diagrams provided for explaining a method for adjustment of alignment between optical waveguides by using an adjustment jig.

DESCRIPTION OF THE PREFERRED EMBODIMENTS

According to the method for mounting an optoelectronic component by using globular spacers as mentioned in the Description of the Related Art, the optoelectronic component is fixed at an uniform height corresponding to the diameter of the globular spacers. Therefore, it is impossible to finely adjust the mounting angle of the optoelectronic component. In addition, in order to mount an optoelectronic component on a substrate, it is normally necessary to electrically connect electrodes of the optoelectronic component and electrodes of the substrate at a mounting surface. However, since, according to the above method, the globular spacers are deposited between electrodes, it is impossible to connect the corresponding electrodes.

In many cases, the electrodes on the optoelectronic component and the substrate are normally connected and fixed to each other with solder bumps. However, since, in these cases, compression stress occurs dependent on the temperature of the solder, it is impossible to realize highly precise alignment with precision of submicron order, which is required in single-mode optical waveguides.

The present invention is made in view of the above problems, and an object of the present invention is to provide a method for production of an optical module which can mount an optoelectronic component at a precise position on a waveguide substrate while connecting corresponding electrodes on the waveguide substrate and the optoelectronic component, and reduce loss in light which propagates in the optical module.

Another object of the present invention is to provide an optical module in which an optoelectronic component is mounted at a precise position on a waveguide substrate so as to reduce loss in light which propagates in the optical module, and corresponding electrodes on the waveguide substrate and the optoelectronic component are connected.

Embodiments of the present invention are explained below with reference to drawings.

Figure 1A:
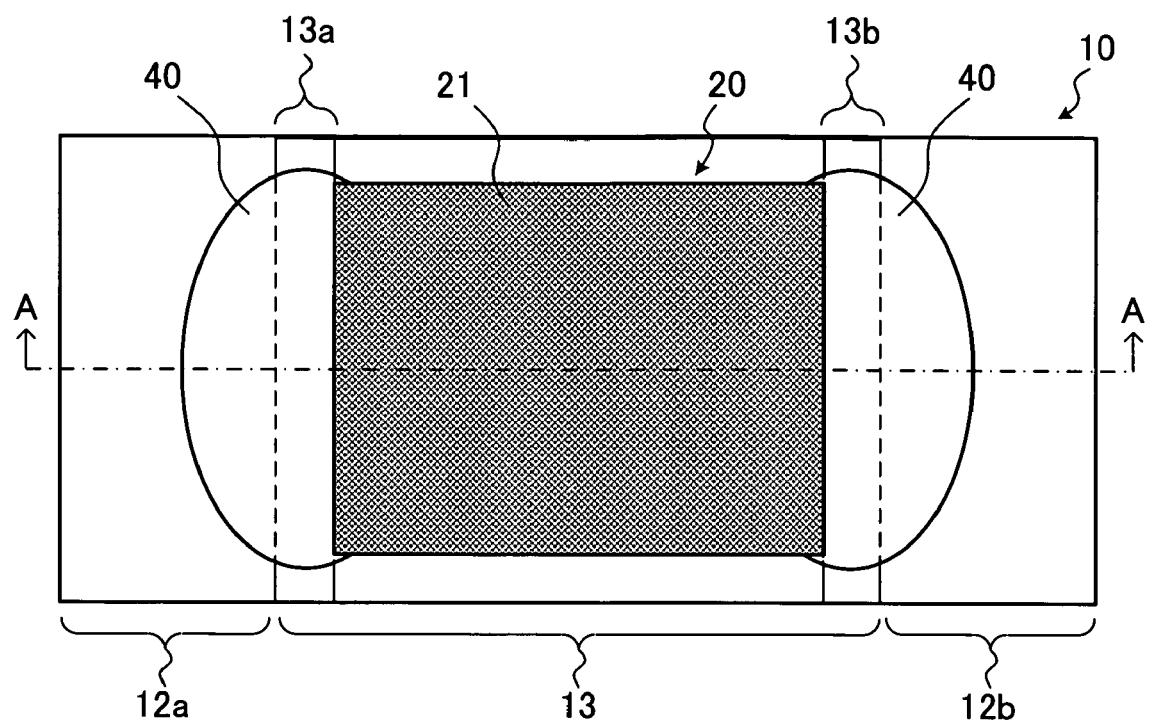
FIGS. 1A and 1B are diagrams illustrating an example of an optical module according to an embodiment of the present invention.
Figure 1B:
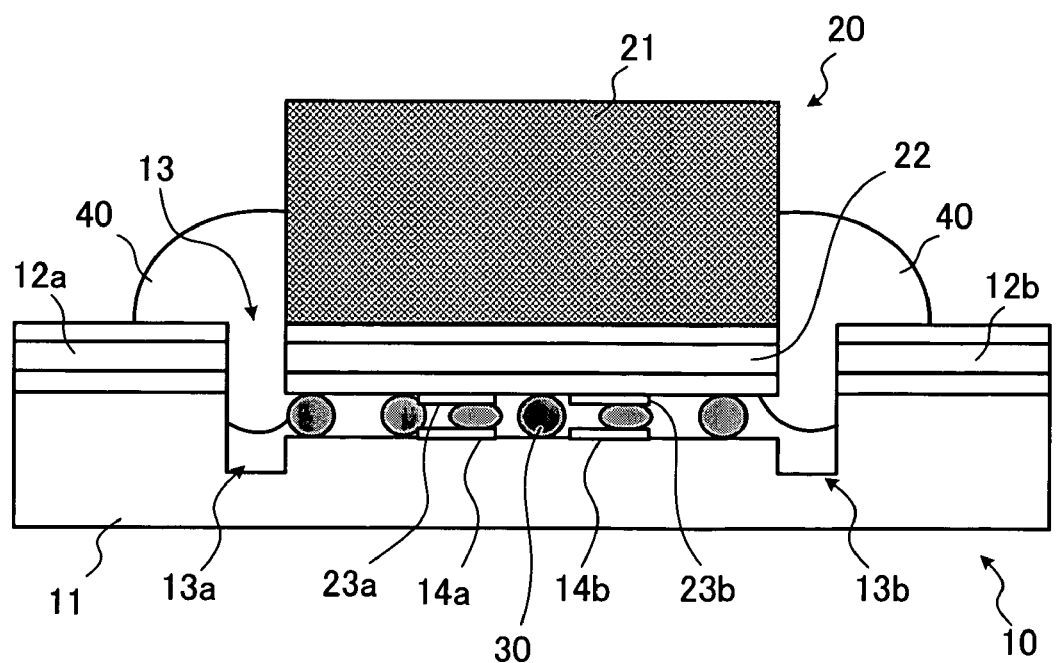

FIGS. 1A and B are diagrams illustrating an example of an optical module according to an embodiment of the present invention. FIG. 1A is a plan view of the optical module, and FIG. 1B is a cross-sectional view of the optical module illustrating a cross section along the A—A line indicated in FIG. 1A.

The optical module illustrated in FIG. 1 has a structure in which an optical deflection element 20 as an optoelectronic component is mounted on a waveguide substrate 10. In the waveguide substrate 10, optical waveguides 12a and 12b are formed on a substrate 11. In addition, globular elastic particles 30 are deposited between the waveguide substrate 10 and the optical deflection element 20. The optical deflection element 20 is fixed to the waveguide substrate 10 with an optical adhesive 40.

In the structure of the waveguide substrate 10, the substrate 11 is made of, for example, quartz, and the optical waveguides 12a and 12b are formed by stacking a cladding layer, a core layer, and a cladding layer which are made of quartz doped with germanium or the like. Although the optical waveguides 12a and 12b in FIG. 1 are formed as slab waveguides, alternatively, the optical waveguides 12a and 12b may be formed as channel waveguides.

In the waveguide substrate 10, a recessed portion 13 for mounting the optical deflection element 20 is arranged so as to separate the optical waveguides 12a and 12b from each other. In addition, grooves 13a and 13b are formed at both ends, in the direction along which the optical waveguides 12a and 12b are formed, of the bottom surface of the recessed portion 13. Further, electrodes 14a and 14b are formed on the bottom surface of the recessed portion 13.

In the optical deflection element 20, an optical waveguide 22 made of a material exhibiting an electro-optic effect is formed on a conductive substrate 21. In addition, prismatic electrodes 23a and 23b are formed on a surface of the optical waveguide 22 on the opposite side to the conductive substrate 21. The prismatic electrodes 23a and 23b are respectively arranged for being connected to the electrodes 14a and 14b on the waveguide substrate 10.

A great number of globular elastic particles 30 are distributed on the bottom surface of the recessed portion 13. Each of the globular elastic particles 30 is conductive. In addition, although the sizes of the globular elastic particles 30 are identical, the diameters of the globular elastic particles 30 are smaller than each of the gap between the electrodes 14a and 14b and the gap between the prismatic electrodes 23a and 23b.

The optical deflection element 20 is placed on the bottom surface of the recessed portion 13 of the waveguide substrate 10 through the globular elastic particles 30 in such a manner that the surface on which the prismatic electrodes 23a and 23b are arranged faces toward the waveguide substrate 10. Since the globular elastic particles 30 are conductive, and distributed on the bottom surface of the recessed portion 13, the electrodes 14a and 14b arranged on the waveguide substrate 10 are electrically connected to the prismatic electrodes 23a and 23b arranged on the optical deflection element 20, respectively.

In addition, the optical deflection element 20 is fixed to the waveguide substrate 10 with the optical adhesive 40 so that the globular elastic particles 30 are kept being pressed, and light which has propagated through the optical waveguide 22 can be precisely coupled to each of the optical waveguides 12a and 12b on the waveguide substrate 10, and light which has propagated through each of the optical waveguides 12a and 12b on the waveguide substrate 10 can be precisely coupled to the optical waveguide 22. The globular elastic particles 30 are deformed by being pressed by the optical deflection element 20, so that the globular elastic particles 30 exert reactive forces to the bottom portion of the optical deflection element 20 and the bottom surface of the recessed portion 13. The optical adhesive 40 holds the optical deflection element 20 so that the reactive forces do not move the optical deflection element 20 relative to the waveguide substrate 10.

The optical module having the above structure operates as follows. For example, an optical signal in the form of collimated light enters the optical waveguide 12a from the left side in FIG. 1. The optical signal propagates through the optical waveguide 12a, and enters the optical waveguide 22 through the optical adhesive 40. Since the optical waveguide 22 is made of the material exhibiting an electro-optic effect, the refractive index in the optical waveguide 22 can be changed by application of an electric field between the conductive substrate 21 and the prismatic electrodes 23a and 23b, so that the propagating optical signal is deflected. Then, the optical signal deflected in the optical waveguide 22 enters the optical waveguide 12b through the optical adhesive 40, and propagates through the optical waveguide 12b.

In the optical module as explained above, the optical deflection element 20 is placed on the bottom surface of the recessed portion 13 of the waveguide substrate 10 through the globular elastic particles 30, which are deformed when the optical deflection element 20 presses the globular elastic particles 30. When the elasticity of the globular elastic particles 30 is utilized, it is possible to finely adjust the alignment between the optical waveguide 22 in the optical deflection element 20 and each of the optical waveguides 12a and 12b in the waveguide substrate 10 with precision of submicron order. Then, the precisely aligned arrangement is maintained by the optical adhesive 40.

In addition, since the globular elastic particles 30 are conductive, and distributed on the bottom surface of the recessed portion 13, the electrodes 14a and 14b arranged on the waveguide substrate 10 are respectively electrically connected to the corresponding prismatic electrodes 23a and 23b arranged on the optical deflection element 20, through the globular elastic particles 30. Since the diameters of the globular elastic particles 30 are smaller than each of the gap between the electrodes 14a and 14b and the gap between the prismatic electrodes 23a and 23b, it is possible to prevent conduction through the globular elastic particles 30 between the adjacent electrodes 14a and 14b or between the adjacent prismatic electrodes 23a and 23b.

Therefore, it is possible to realize optical coupling between the optical waveguide 22 of the optical deflection element 20 and each of the optical waveguides 12a and 12b on the waveguide substrate 10 with higher reliability, and reduce loss in light which propagates between the optical waveguide 22 and each of the optical waveguides 12a and 12b, while maintaining electric connections between corresponding electrodes on the waveguide substrate 10 and the optical deflection element 20.

In addition, since the grooves 13a and 13b are arranged at both ends of the bottom surface of the recessed portion 13, the globular elastic particles 30 distributed around the ends of the bottom surface of the recessed portion 13 fall in the grooves 13a and 13b. Therefore, it is possible to prevent blocking of the optical path between the optical waveguide 22 of the optical deflection element 20 and each of the optical waveguides 12a and 12b on the waveguide substrate 10 caused by intrusion of the globular elastic particles 30 into the gap between the end face of each of the optical waveguides 12a and 12b and a corresponding one of the end faces of optical waveguide 22. For this purpose, it is preferable that the widths of the grooves 13a and 13b are greater than the diameter of the globular elastic particles 30.

Next, a concrete example of the above optical module and a production process of the concrete example of the optical module are explained. According to this production process, the optical deflection element 20 are formed in advance as illustrated in FIGS. 2A and 2B, and the waveguide substrate 10 are formed in advance as illustrated in FIGS. 3A and 3B.

Figure 2A:
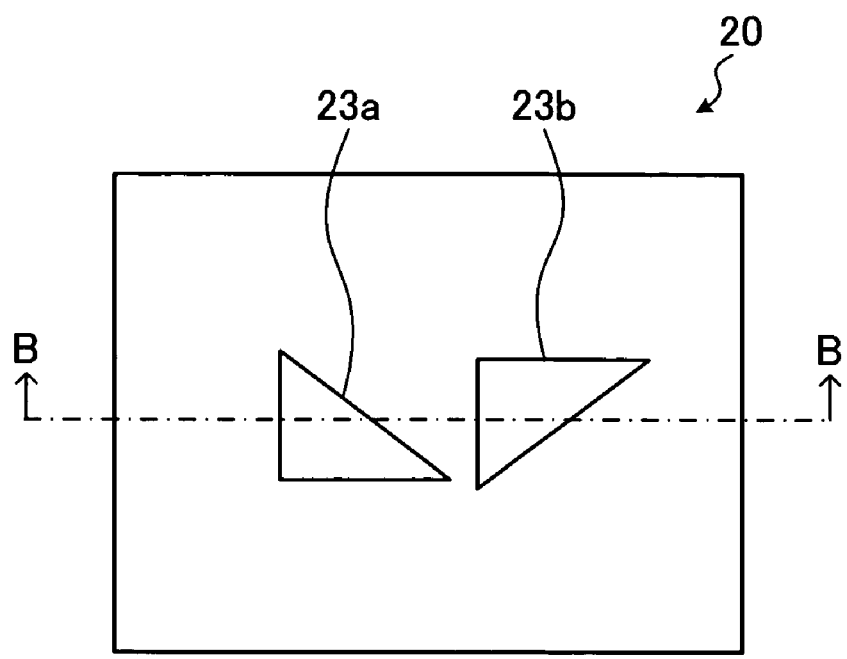
FIGS. 2A and 2B are diagrams illustrating an example of a construction of an optical deflection element.
Figure 2B:
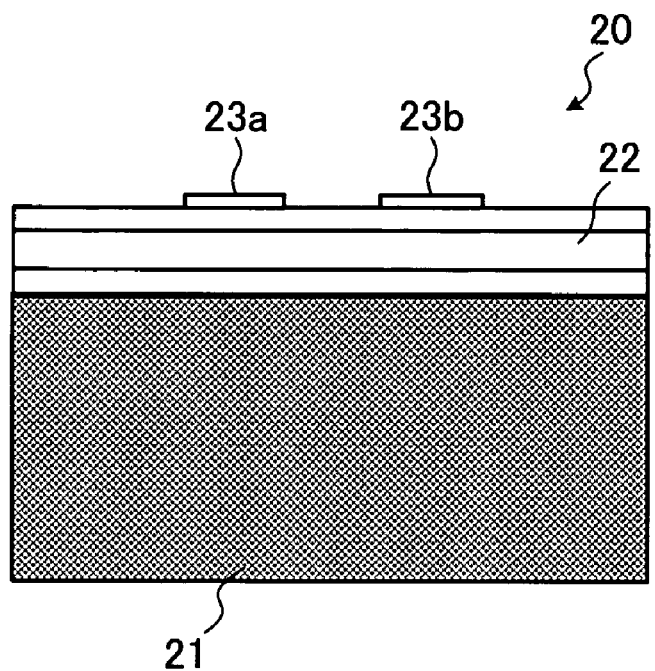
Figure 3A:
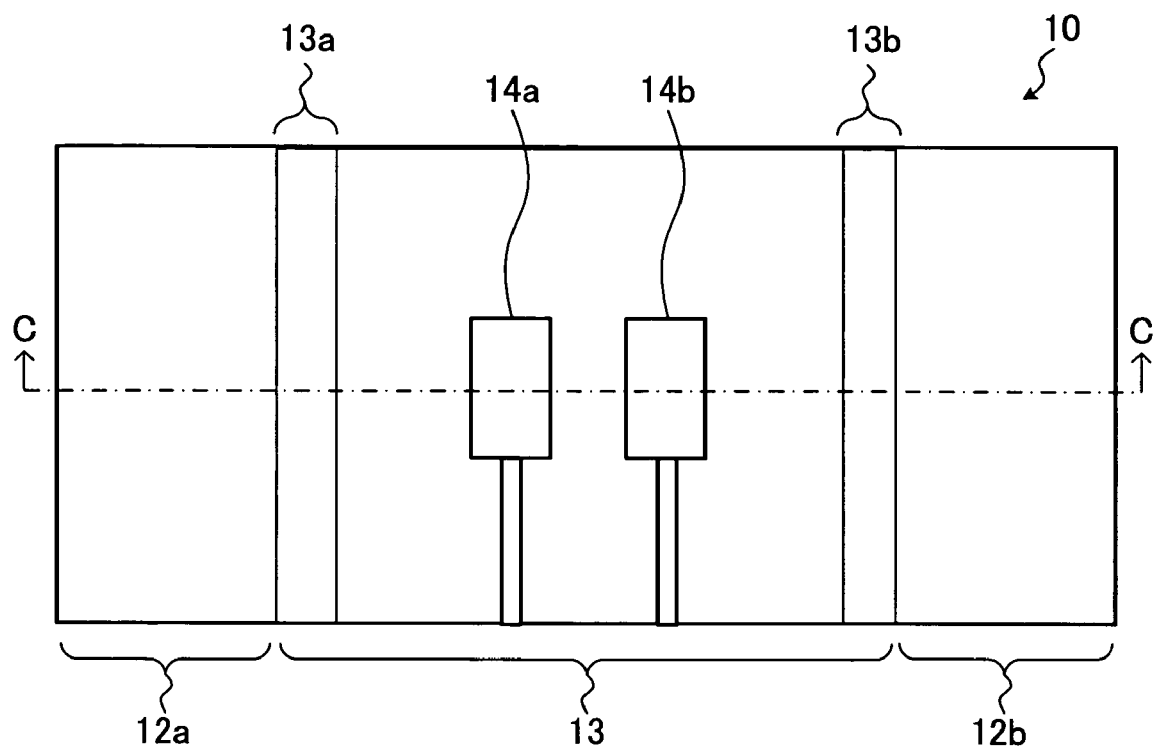
FIGS. 3A and 3B are diagrams illustrating an example of a construction of a waveguide substrate.
Figure 3B:
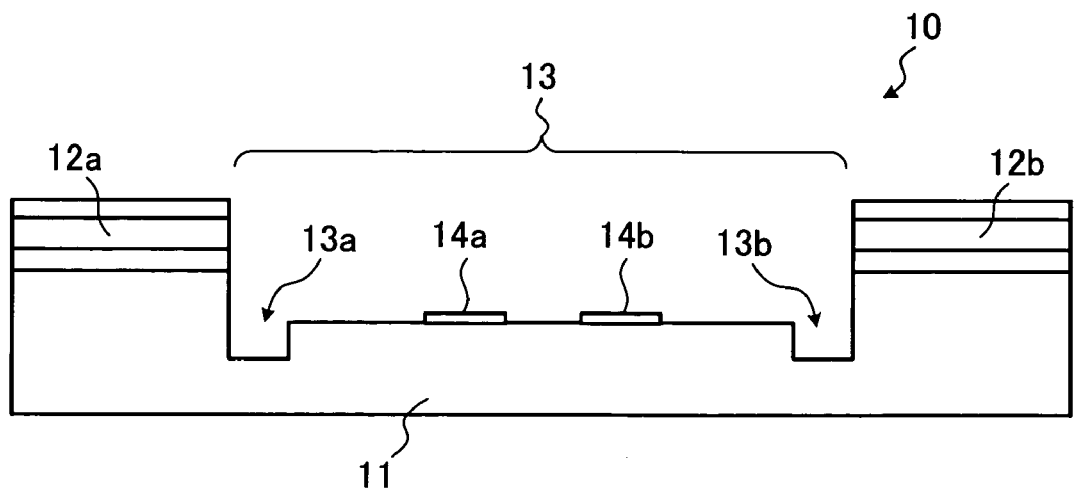

FIGS. 2A and 2B are diagrams illustrating an example of a construction of the optical deflection element 20. FIG. 2A is a plan view of the optical deflection element 20, and FIG. 2B is a cross-sectional view of the optical deflection element 20 illustrating a cross section along the B—B line indicated in FIG. 2A.

In the structure of the optical deflection element 20, the optical waveguide 22 is formed on the conductive substrate 21, and the prismatic electrodes 23a and 23b are formed on the optical waveguide 22. The conductive substrate 21 is formed of a single crystal of STO ($SrTiO_3$) which is doped with niobium for making the STO crystal conductive. In addition, the cladding and the core of the optical waveguide 22 are respectively made of PLZT (($Pb_{0.91}La_{0.09}$)($Zr_{0.65}Ti_{0.35}$)) and PZT ($Pb(Zr_{0.52}Ti_{0.48})O_3$), which are ferroelectric lead-based perovskites.

The layers of the optical waveguide 22 can be formed by heteroepitaxial growth of PLZT, PZT, and PLZT layers on the conductive substrate 21 in this order by using MOCVD (Metal Organic Chemical Vapor Deposition), the sol-gel process, sputtering, PLD (Pulsed Laser Deposition), or the like. The total thickness of the optical waveguide 22 including the core and the upper and lower claddings is, for example, 9 micrometers.

Thereafter, the prismatic electrodes 23a and 23b each having a triangular shape are formed on the surface of the optical waveguide 22 on the opposite side to the conductive substrate 21. Each of the prismatic electrodes 23a and 23b is a platinum film formed by sputtering using a metal mask, and has a thickness of 2,000 Angstrom. In addition, it is necessary that the gap between the prismatic electrodes 23a and 23b is greater than the diameter of the globular elastic particles 30 which are used at a later stage. For example, when the diameter of each of the used globular elastic particles 30 is 7 micrometers, the minimum gap between the prismatic electrodes 23a and 23b is determined to be 100 micrometers. In the case where the gap between the prismatic electrodes 23a and 23b is 100 micrometers, it is possible to prevent occurrence of a short circuit even when at most about ten globular elastic particles are deposited between the prismatic electrodes 23a and 23b.

Although two prismatic electrodes 23a and 23b corresponding to different directions of deflection are formed in the example of FIGS. 2A and 2B, only one of the two prismatic electrodes 23a and 23b is formed may be other cases.

FIGS. 3A and 3B are diagrams illustrating an example of a construction of the waveguide substrate 10. FIG. 3A is a plan view of the waveguide substrate 10, and FIG. 3B is a cross-sectional view of the waveguide substrate 10 illustrating a cross section along the C—C line indicated in FIG. 3A.

In this example, the substrate 11 in the waveguide substrate 10 is made of quartz, and the cores of the optical waveguides 12a and 12b on the waveguide substrate 10 are made of quartz in which germanium is diffused for increasing the refractive index. First, a core region of quartz in which germanium is diffused is formed on the substrate 11 having a planar form, and then a layer of quartz as an overcladding is formed over the core region by sputtering. Thus, a uniform waveguide structure is formed over the substrate 11 so that the thickness of the optical waveguide is equal to the thickness of the optical waveguide 22 on the optical deflection element 20.

Next, the recessed portion 13 for mounting the optical deflection element 20 are formed by RIE (Reactive Ion Etching) using fluorine-based gas, and has a depth of 15 micrometers from the upper surface of the overcladding of the waveguide formed over the substrate 11. In order to allow a margin in arrangement of the optical deflection element 20, the recessed portion 13 is formed so as to have a length which is 100 µm greater than the length of the optical waveguide 22 on the optical deflection element 20 in the direction of the optical path.

Thereafter, the grooves 13a and 13b are formed at both ends, in the direction of the optical path, of the bottom surface of the recessed portion 13 by applying a resist to the bottom surface of the recessed portion 13, and performing patterning and RIE (Reactive Ion Etching) so that the grooves 13a and 13b each have a depth of 10 micrometers and a width of 50 micrometers from one of the two end faces of the recessed portion 13 in the direction of the optical path.

In addition, the electrodes 14a and 14b, which are respectively to be connected to the prismatic electrodes 23a and 23b on the optical deflection element 20, are formed on the bottom surface of the recessed portion 13 by applying a resist to the bottom surface of the recessed portion 13, performing patterning, forming a titanium film having a thickness of 500 Angstrom by sputtering, and forming a platinum film having a thickness of 2,000 Angstrom by the lift-off technique. Further, it is necessary that the gap between the electrodes 14a and 14b, as well as the gap between the prismatic electrodes 23a and 23b, is greater than the diameter of the globular elastic particles 30, which are used at a later stage.

Hereinbelow, an example of a method for mounting the optical deflection element 20 on the waveguide substrate 10 is explained with reference to FIGS. 4A to 6B, which are diagrams provided for explaining the method for mounting the optical deflection element on the waveguide substrate.

Figure 4A:
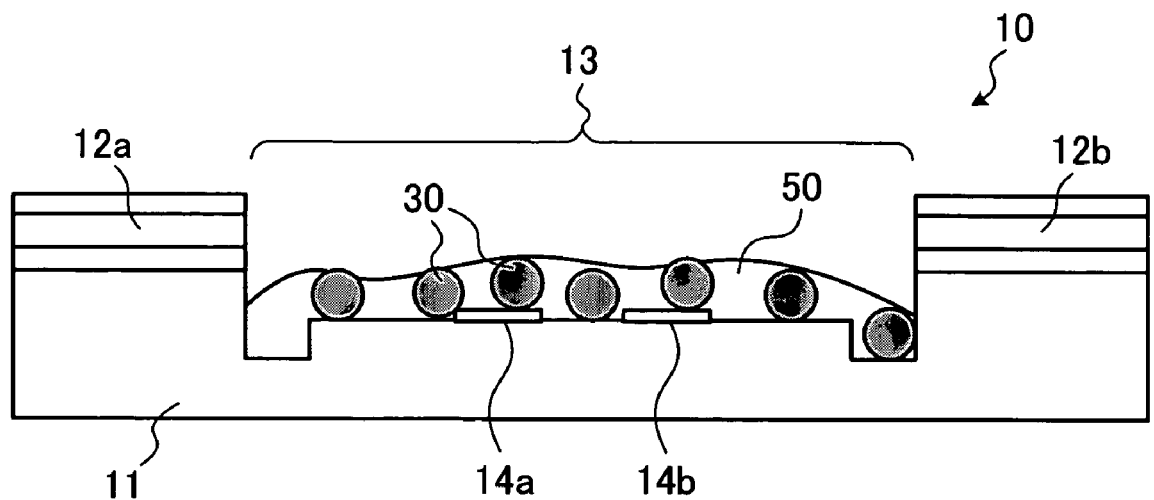
FIGS. 4A and 4B are diagrams provided for explaining a method for mounting an optical deflection element on a waveguide substrate.

First, as illustrated in FIG. 4A, globular elastic particles 30 each having a diameter of 7 micrometers are mixed into and suspended in ethanol 50, and the suspension of globular elastic particles in the ethanol 50 is applied to the bottom surface of the recessed portion 13 of the waveguide substrate 10. Details of the globular elastic particles 30 are explained later with reference to FIG. 7. Although the diameters of the globular elastic particles 30 and the thicknesses of the optical waveguides 12a, 12b, and 22 are exaggerated in the attached drawings for clarifying illustrations, the actual diameter and thicknesses of these elements are much smaller than the length of the optical waveguide 22 along the optical path, and the actual number of the globular elastic particles 30 is much greater than the number of globular elastic particles illustrated in the attached drawings.

Figure 4B:
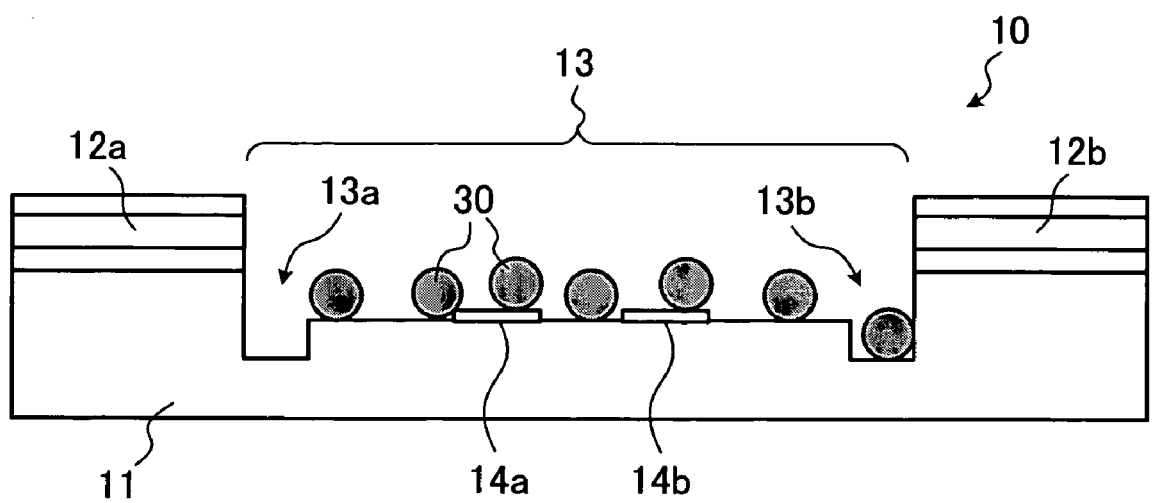

Subsequently, as illustrated in FIG. 4B, the ethanol 50 is evaporated, so that the globular elastic particles 30 are randomly distributed on the bottom surface of the recessed portion 13. In addition, portions of the globular elastic particles 30 which are distributed in vicinities of the end faces of the optical waveguides 12a and 12b on the bottom surface of the recessed portion 13 fall in the grooves 13a and 13b.

In the above process, it is necessary to adjust the amount of the globular elastic particles 30 mixed into the ethanol 50 so that the globular elastic particles 30 do not cover the recessed portion 13, and are spaced out.

Figure 5A:
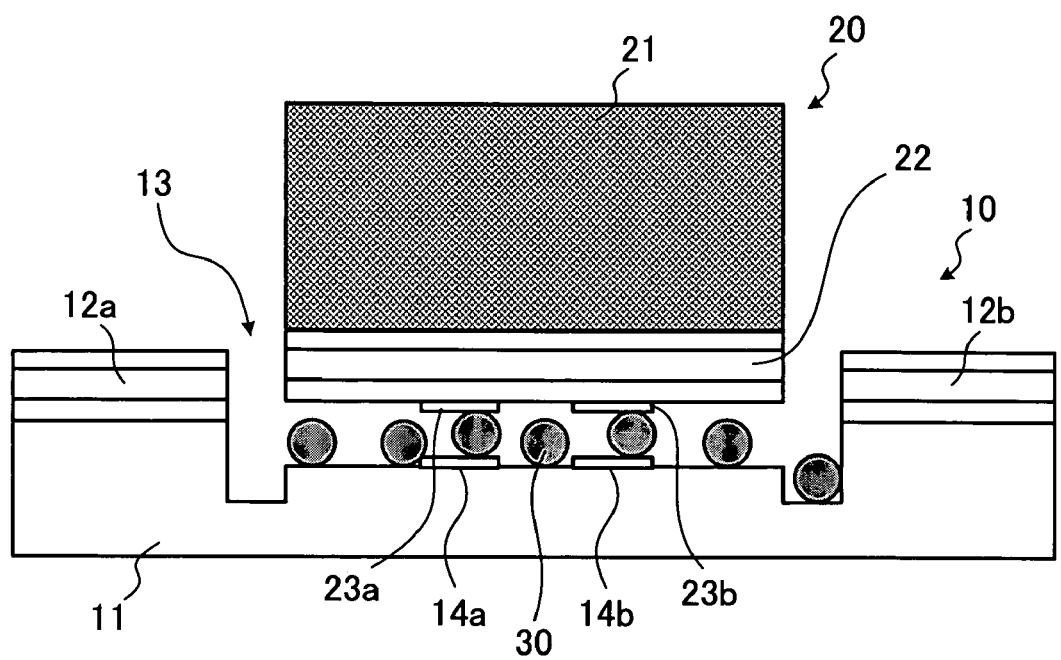
FIGS. 5A and 5B are diagrams provided for explaining a method for mounting an optical deflection element on a waveguide substrate.

Next, as illustrated in FIG. 5A, the optical deflection element 20 is placed in the recessed portion 13 of the waveguide substrate 10 so that the contact surfaces of the prismatic electrodes 23a and 23b face toward the waveguide substrate 10. Thereby, a great number of globular elastic particles 30 are sandwiched between the bottom surface of the recessed portion 13 and the optical deflection element 20 and between the electrodes 14a and 14b on the waveguide substrate 10 and the corresponding prismatic electrodes 23a and 23b.

Figure 5B:
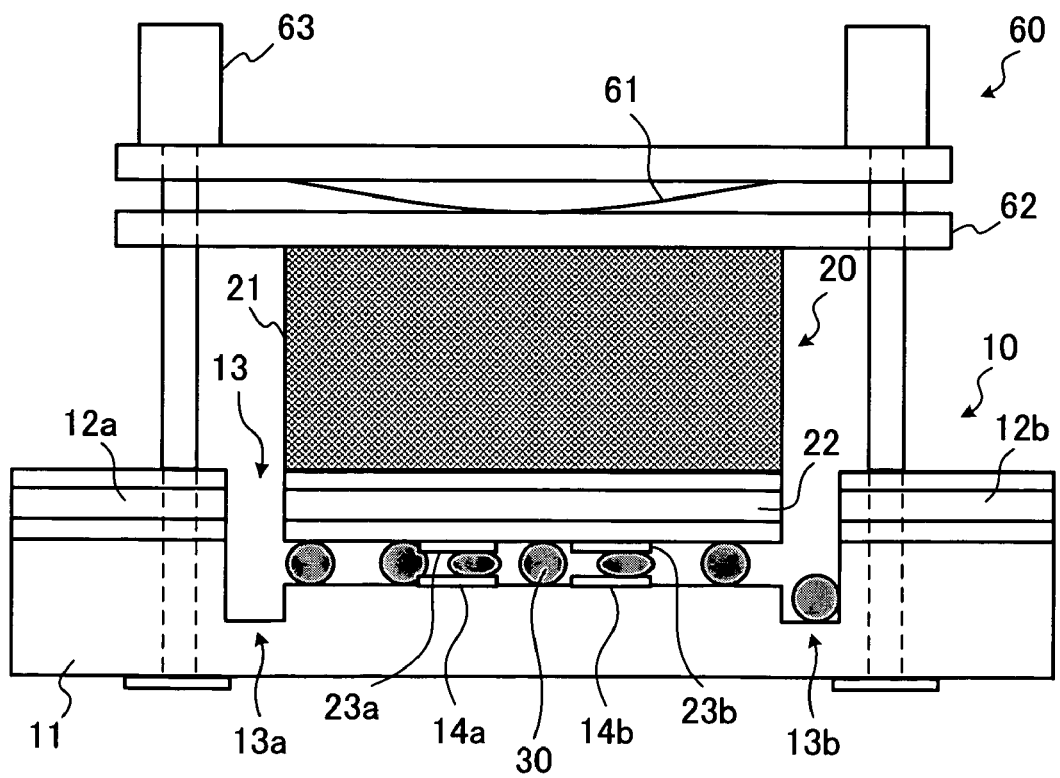

Subsequently, as illustrated in FIG. 5B, alignment between the optical waveguide 22 in the optical deflection element 20 and each of the optical waveguides 12a and 12b on the waveguide substrate 10 is adjusted by using an adjustment jig 60, which is provided for adjusting the mounting position of the optical deflection element 20 with respect to the waveguide substrate 10. The adjustment jig 60 comprises a plate spring 61, a pressing plate 62, and four micrometers 63. The pressing plate 62 is pressed by the plate spring 61 so as to keep the pressing plate 62 in contact with the conductive substrate 21 of the optical deflection element 20. The micrometers 63 are provided for finely adjusting the amount of movement of the pressing plate 62 in the vertical direction. The adjustment jig 60 is fixed to the waveguide substrate 10.

In addition, the four micrometers 63 are respectively arranged at the four corners of the adjustment jig 60 so that two of the four micrometers 63 are located on each of the right and left sides (in the direction perpendicular to the plane of FIG. 5B) of the optical axis of the optical waveguides 12a, 12b, and 22, and the two of the four micrometers on each side are located on forward and backward sides of the optical waveguide 22. Therefore, it is possible to adjust the angles at which the optical waveguide 22 tilts forward, backward, and sideways, as well as the height at which the optical deflection element 20 is mounted. An example of a method of alignment between the optical waveguide 22 and each of the optical waveguides 12a and 12b is explained in detail later with reference to FIGS. 8A, 8B, and 9.

It is necessary to determine the diameter of the globular elastic particles 30 so that the optical waveguide 22 is located slightly higher than the optical waveguides 12a and 12b of the waveguide substrate 10 when the bottom surface of the optical deflection element 20 first comes into contact with the globular elastic particles 30.

Thereafter, when the pressing plate 62 is further pressed down by using the micrometers 63 so that the optical deflection element 20 is pressed toward the waveguide substrate 10, the globular elastic particles 30 deform, and the elevation of the optical deflection element 20 is lowered. Therefore, the condition related to optical coupling between the optical waveguide 22 and each of the optical waveguides 12a and 12b can be adjusted with precision of submicron order by utilizing the elasticity of the globular elastic particles 30.

In addition, since the globular elastic particles 30 are conductive, the electrodes 14a and 14b on the waveguide substrate 10 are respectively electrically connected to the corresponding prismatic electrodes 23a and 23b on the optical deflection element 20. Further, since the diameters of the globular elastic particles 30 are smaller than each of the gap between the electrodes 14a and 14b and the gap between the prismatic electrodes 23a and 23b, it is possible to prevent conduction through the globular elastic particles 30 between the adjacent electrodes 14a and 14b or between the adjacent prismatic electrodes 23a and 23b. Therefore, electrical connection between the corresponding electrodes on the waveguide substrate 10 and the optical deflection element 20 are established with high reliability.

Furthermore, since the grooves 13a and 13b are formed in the recessed portion 13 of the waveguide substrate 10, portions of the globular elastic particles 30 which are distributed in vicinities of the end faces of the optical waveguides 12a and 12b on the bottom surface of the recessed portion 13 fall in the grooves 13a and 13b, and are then contained in the grooves 13a and 13b. Therefore, the optical path between the optical waveguide 22 and each of the optical waveguides 12a and 12b is secured with high reliability.

Figure 6A:
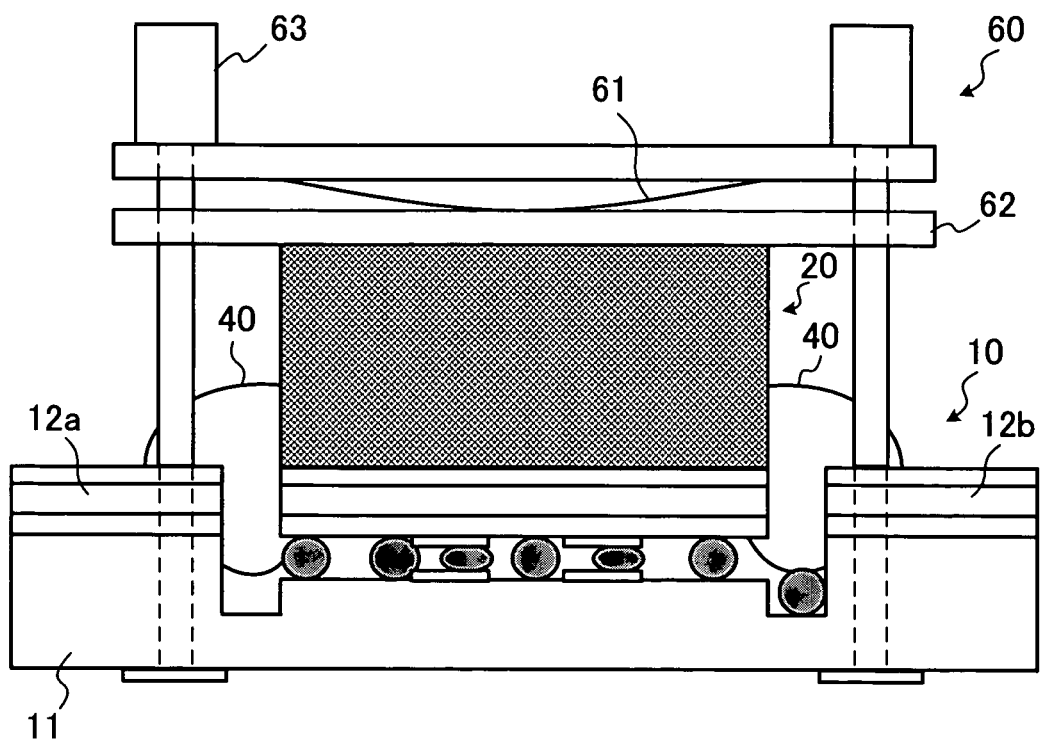
FIGS. 6A and 6B are diagrams provided for explaining a method for mounting an optical deflection element on a waveguide substrate.
Figure 6B:
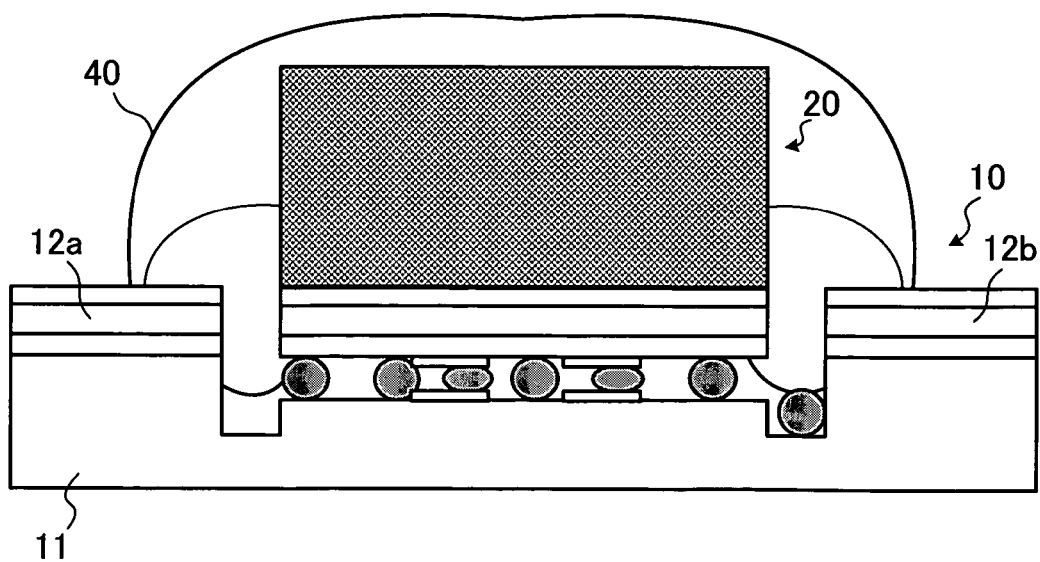

As explained above, the optical deflection element 20 is held by the adjustment jig 60 in an arrangement in which alignment between the optical waveguides is correctly adjusted. Then, while maintaining the above arrangement, as illustrated in FIG. 6A, an optical adhesive 40 is injected into the gap between the optical waveguide 22 and each of the optical waveguides 12a and 12b of the waveguide substrate 10, and the optical deflection element 20 is temporarily fixed to the waveguide substrate 10. The optical adhesive 40 is, for example, an ultraviolet-curing type epoxy resin. After the optical adhesive 40 is completely cured, the adjustment jig 60 is removed from the waveguide substrate 10. Then, an additional amount of the optical adhesive 40 is deposited as illustrated in FIG. 6B so that the optical deflection element 20 is completely fixed to the waveguide substrate 10.

Although, according to the above mounting method, the deposition of the optical adhesive 40 for fixing the optical deflection element 20 is performed in two steps, alternatively, it is possible to fix the optical deflection element 20 by depositing the optical adhesive 40 in a single step while holding the optical deflection element 20 with the adjustment jig 60 after the adjustment of alignment between the optical waveguides.

Figure 7:
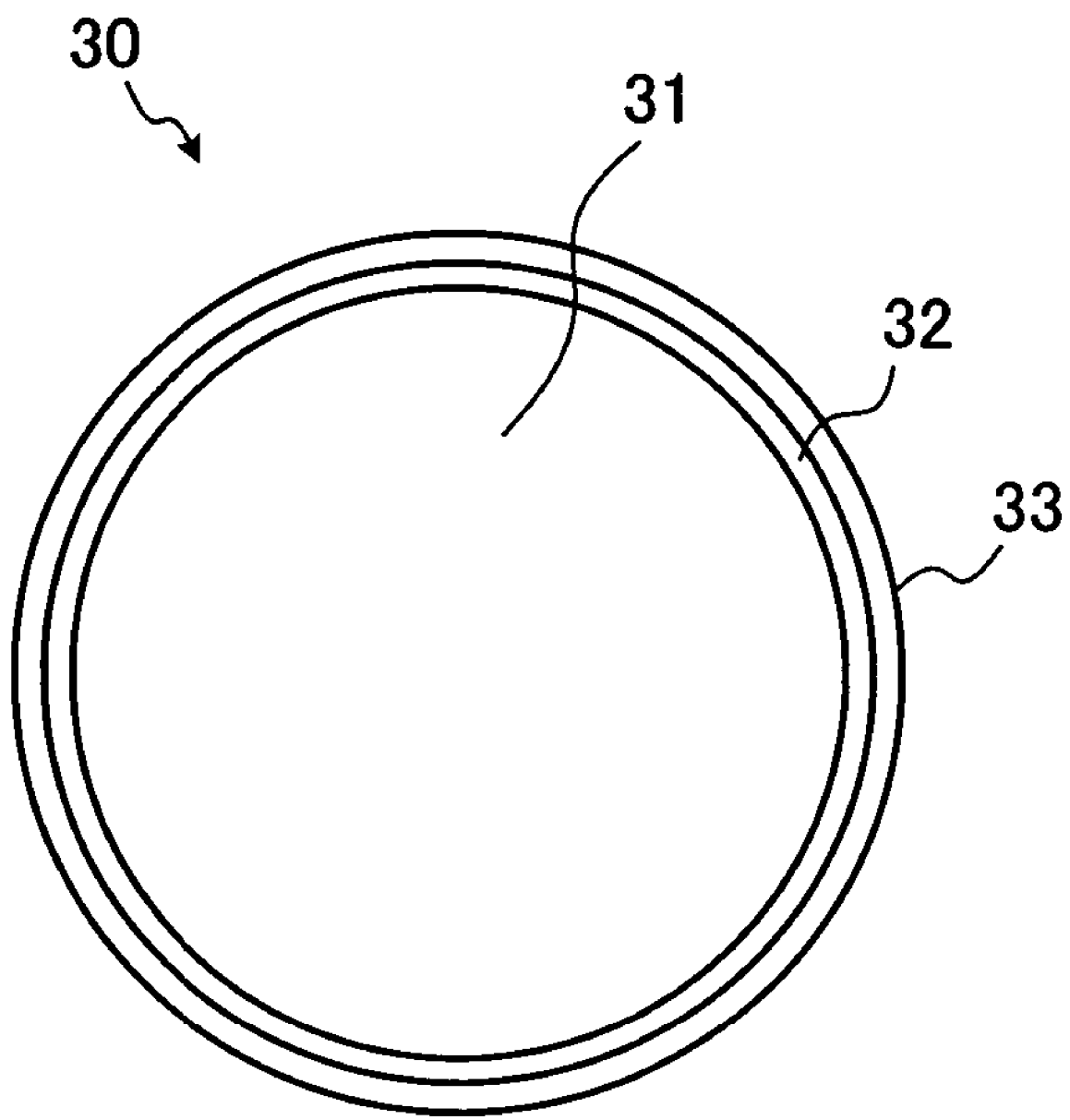
FIG. 7 is a cross-sectional view of an example of a construction of a globular elastic particle.

An example of realization of the globular elastic particles 30 is explained below. FIG. 7 is a cross-sectional view of an example of a construction of a globular elastic particle.

In the present invention, it is possible to realize the globular elastic particles 30 by coating a globular particle made of an elastic organic material such as a resin with a conductive metal. FIG. 7 shows an example which is formed by coating a globular resin core 31 with two metal films 32 and 33. The globular resin core 31 is made of, for example, polystyrene, and each of the globular elastic particles 30 is produced by forming a nickel film and a gold film as the metal films 32 and 33 in this order. For example, the conductive fine particles "micropearl" (which are available from Sekisui Chemical Co. Ltd., Japan) can be preferably used as the globular elastic particles 30, where "micropearl" is a registered trademark of Sekisui Chemical Co. Ltd. It is possible to choose for use a diameter appropriate for adjusting alignment between the optical deflection element 20 and the waveguide substrate 10.

Next, FIGS. 8A and 8B are diagrams provided for explaining a method for adjustment of alignment between optical waveguides by using the adjustment jig 60. FIG. 8A is a plan view of an entire arrangement including the adjustment jig 60, and FIG. 8B is a cross-sectional view of the arrangement illustrating a cross section along the D—D line indicated in FIG. 8A.

As illustrated in FIGS. 8A and 8B, the direction of the optical path in the optical waveguides corresponds to the X axis, the direction of the elevation from the waveguide plane corresponds to the Y axis, and the sideway direction within the waveguide plane corresponds to the Z axis.

When alignment between the waveguides is adjusted, optical fibers 71a and 71b and photodetectors (PDs) 72a and 72b are used. The optical fibers 71a and 71b are provided for injecting light into the optical waveguides, and the photodetectors 72a and 72b are provided in correspondence with the optical fibers 71a and 71b, respectively. The optical fibers 71a and 71b are arranged side by side in the Z-axis direction so that light injected through the optical fiber 71a and light injected through the optical fiber 71b are parallel to each other, and the photodetectors 72a and 72b receive through the optical waveguide 22 and the optical waveguide 12b the light injected through the optical fiber 71a and the light injected through the optical fiber 71b, respectively. In this configuration, the micrometers 63 are adjusted while detecting the intensities of light received by the photodetectors 72a and 72b. When the detected intensities are maximized, it is determined that the optical waveguides are correctly aligned.

In the adjustment jig 60, four micrometers 63a, 63b, 63c, and 63d are provided for independently adjusting amounts of pressure at the four corners of the pressing plate 62. Thus, it is possible to finely adjusting the height and the mounting angles of the optical deflection element 20 with respect to the waveguide substrate 10.

Figure 9:
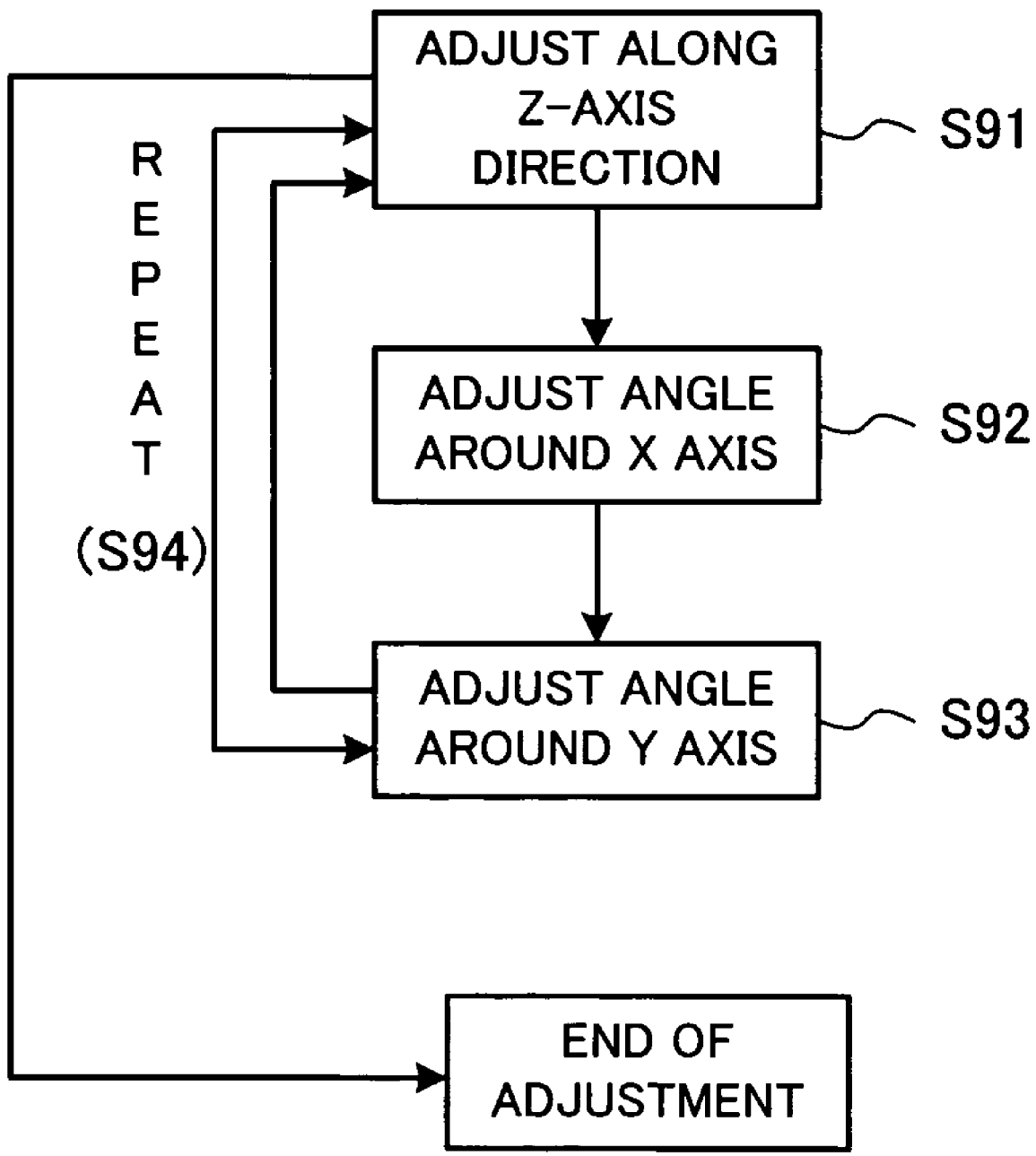
FIG. 9 is a sequence diagram indicating a sequence for adjusting alignment between an optical deflection element and a waveguide substrate by using micrometers.

FIG. 9 is a sequence diagram indicating a sequence for adjusting alignment between the optical deflection element and the waveguide substrate by using the micrometers 63a, 63b, 63c, and 63d.

First, in step S91, the micrometers 63a, 63b, 63c, and 63d are adjusted while equalizing the amounts of displacement at the micrometers 63a, 63b, 63c, and 63d so that the intensities of light received by the photodetectors 72a and 72b are maximized. Thus, the height of the optical deflection element 20 with respect to the waveguide substrate 10 is roughly adjusted.

Subsequently, in step S92, each of the pair of the micrometers 63a and 63b and the pair of the micrometers 63c and 63d is independently adjusted so as to equalize the intensities of light received by the photodetectors 72a and 72b. Thus, the mounting angle of the optical deflection element 20 around the X axis is adjusted.

Next, in step S93, each of the pair of the micrometers 63a and 63c and the pair of the micrometers 63b and 63d is independently adjusted so as to maximize the intensity of light received by each of the photodetectors 72a and 72b. Thus, the mounting angle of the optical deflection element 20 around the Y axis is adjusted.

After the above operations, the operation goes back to step S91, the height of the entire optical deflection element 20 is adjusted again. Thereafter, the adjustment in steps S93 and S91 are repeated, for example, three times in step S94, and then the sequence of operations for adjustment in FIG. 9 is completed.

According to the above sequence of operations for adjustment, it is possible to adjust the height and mounting angles of the optical waveguide 22 of the optical deflection element 20 with respect to the optical waveguides 12a and 12b on the waveguide substrate 10, and realize optical coupling of light which propagates between the optical waveguide 22 of the optical deflection element 20 and each of the optical waveguides 12a and 12b on the waveguide substrate 10, with high reliability.

In the above process for producing an optical module, the optical deflection element 20 is placed on the recessed portion 13 of the waveguide substrate 10 through the globular elastic particles 30, and the height and the mounting angles of the optical deflection element 20 are finely adjusted by pressing the optical deflection element 20 in the above arrangement so as to deform the globular elastic particles 30. According to the above adjustment method, it is possible to improve the precision in alignment between the optical waveguide 22 of the optical deflection element 20 and each of the optical waveguides 12a and 12b on the waveguide substrate 10 by utilizing the elasticity of the globular elastic particles 30.

In addition, since the globular elastic particles 30 are conductive, and are distributed on the bottom surface of the recessed portion 13, the electrodes 14a and 14b on the waveguide substrate 10 are respectively electrically connected to the corresponding prismatic electrodes 23a and 23b on the optical deflection element 20. Therefore, it is possible to realize optical coupling between the optical waveguide 22 of the optical deflection element 20 and the optical waveguides 12a and 12b on the waveguide substrate 10 with higher reliability while electrically connecting the corresponding electrodes on the waveguide substrate 10 and the optical deflection element 20 with high reliability, so that loss in light which propagates in the optical module can be reduced.

In the above process for producing an optical module, for example, the globular elastic particles 30 are randomly distributed on the bottom surface of the recessed portion 13 by applying the ethanol 50 in which the globular elastic particles 30 are mixed, to the bottom surface of the recessed portion 13, and drying the bottom surface. However, when the globular elastic particles 30 are distributed by using the ethanol 50, it is necessary to adjust the amount of the globular elastic particles 30 in the ethanol 50 as mentioned before, and appropriately control the distribution density of the globular elastic particles 30 on the waveguide substrate 10. This is because when the distribution density is inappropriate, for example, the problems as indicated in FIGS. 10 and 11 can occur.

Figure 10:
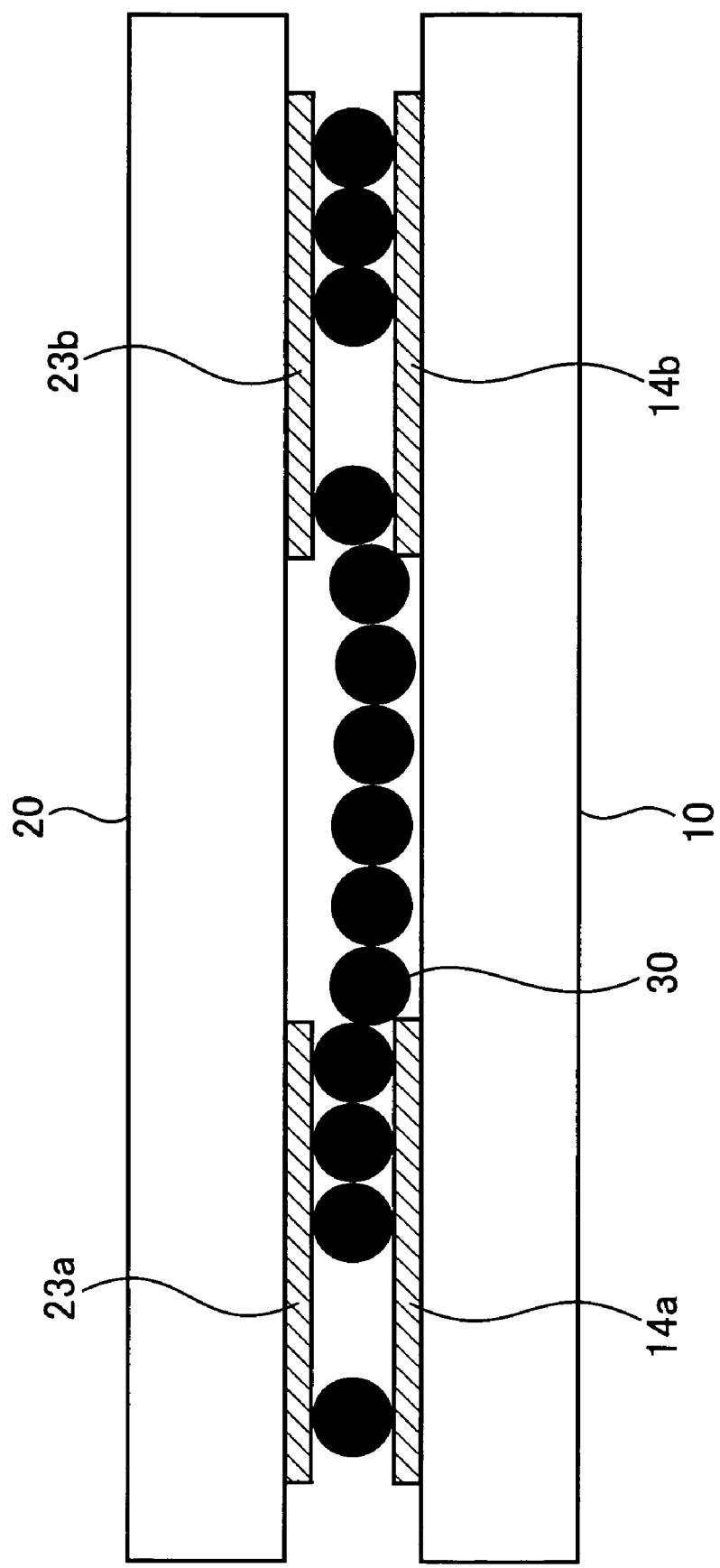
FIG. 10 is a diagram indicating a problem which can occur in the case where the distribution density of globular elastic particles is high.

FIG. 10 is a diagram indicating a problem which can occur in the case where the distribution density of the globular elastic particles is high. When the distribution density of the globular elastic particles 30 is too high, globular elastic particles deposited between the electrodes 14a and 14b on the waveguide substrate 10 or between the prismatic electrodes 23a and 23b on the optical deflection element 20 can contact with each other, and a short circuit can occur.

Figure 11:
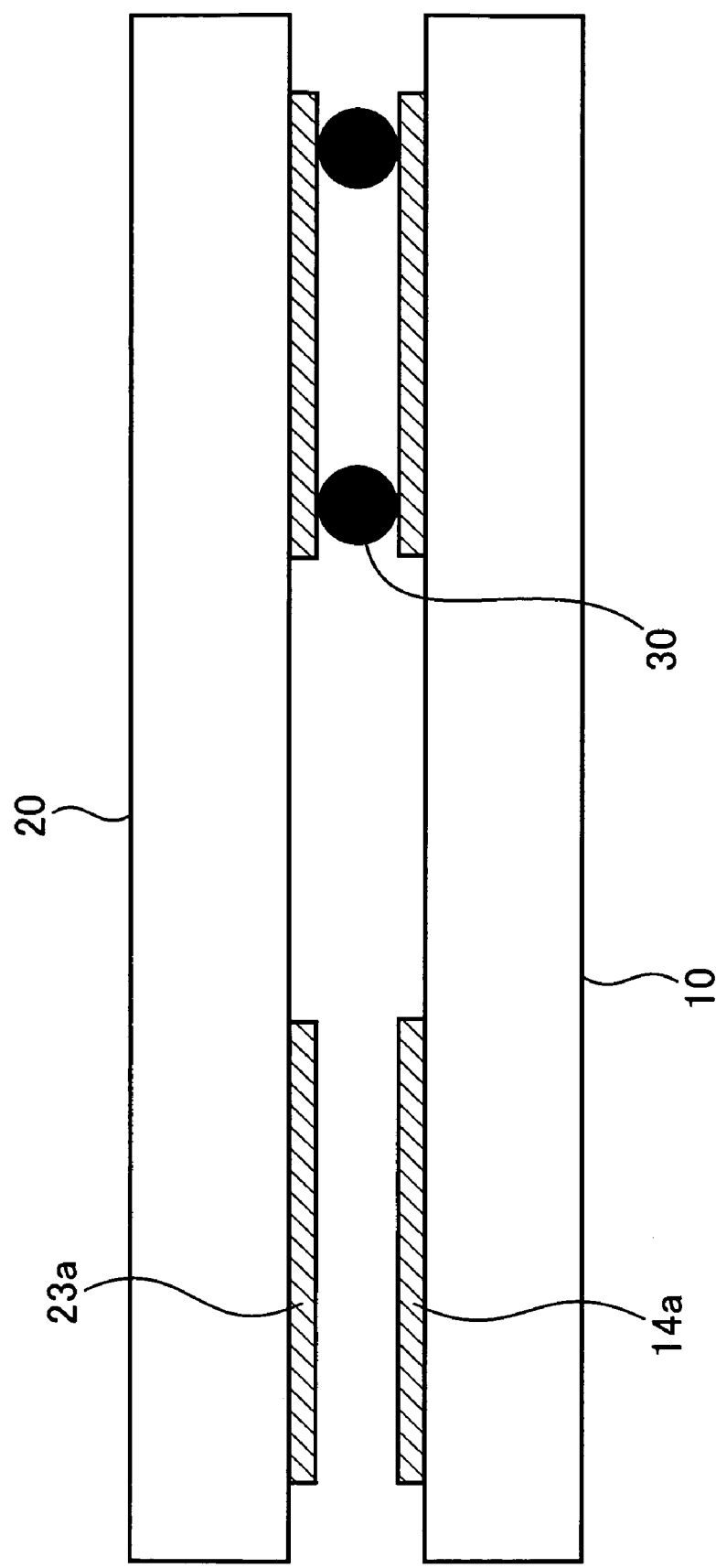
FIG. 11 is a diagram indicating a problem which can occur in the case where the distribution density of globular elastic particles is low.

FIG. 11 is a diagram indicating a problem which can occur in the case where the distribution density of the globular elastic particles is low. When the distribution density of the globular elastic particles 30 is too low, for example, a situation in which no globular elastic particle is deposited between the electrode 14a on the waveguide substrate 10 and the corresponding prismatic electrode 23a on the optical deflection element 20 can occur. In such a case, the corresponding electrodes cannot be electrically connected.

Figure 12:
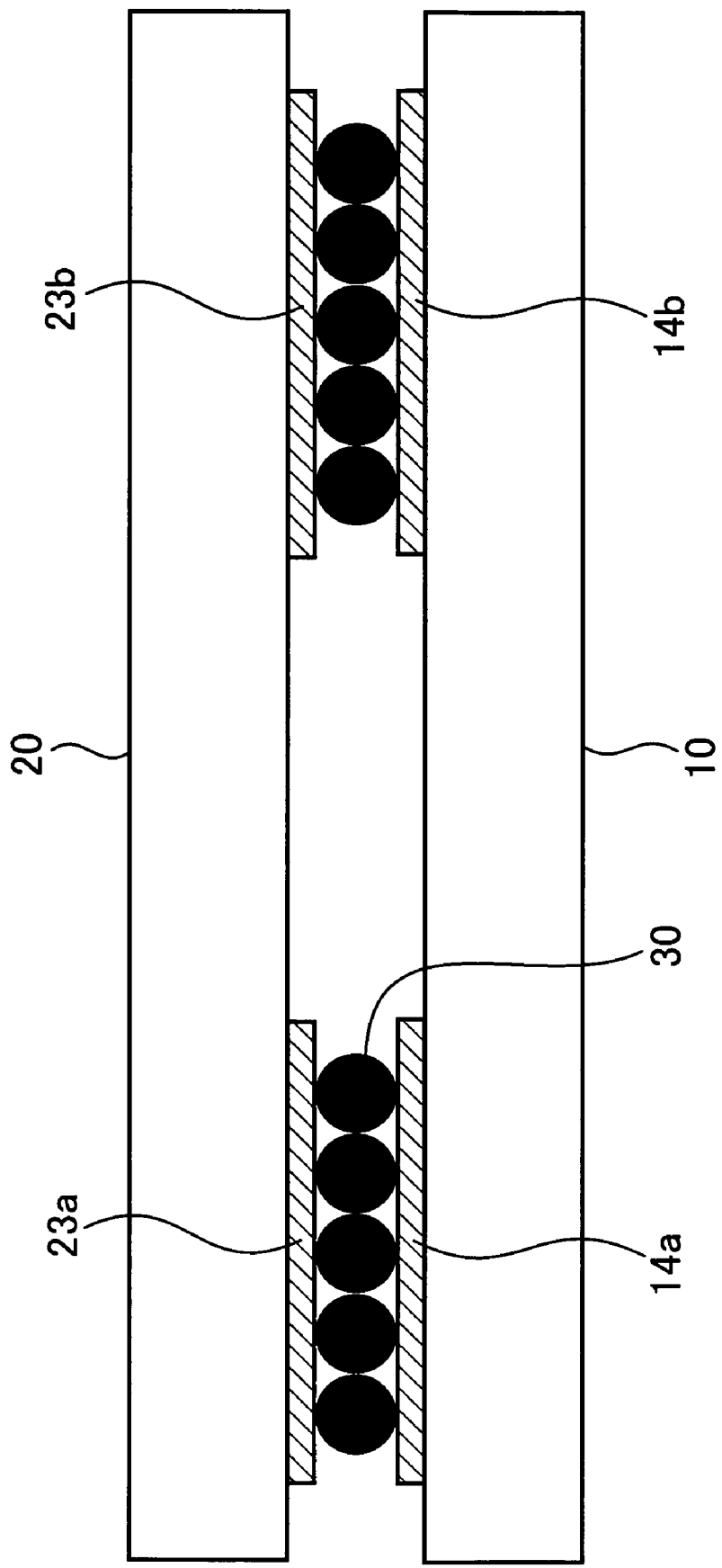
FIG. 12 is a diagram schematically illustrating electrode-connection portions in an arrangement in which an optical deflection element is mounted on a waveguide substrate.

In consideration of the above problems, in order to prevent occurrence of a short circuit or poor connection, and electrically connect the corresponding electrodes with higher reliability, it is effective to concentratedly deposit the globular elastic particles 30 in an electrode portion (i.e., an area in which en electrode is formed, or an area including an electrode and the vicinity of the electrode). FIG. 12 is a diagram schematically illustrating electrode-connection portions in an arrangement in which an optical deflection element is mounted on a waveguide substrate. That is, it is desirable that the globular elastic particles 30 are concentratedly deposited in the gaps between the electrodes 14a and 14b on the waveguide substrate 10 and the prismatic electrodes 23a and 23b which are respectively located opposite to the electrodes 14a and 14b, as schematically illustrated in FIG. 12. Hereinbelow, a method for depositing the globular elastic particles 30 in such an arrangement is explained in detail.

Figure 13:
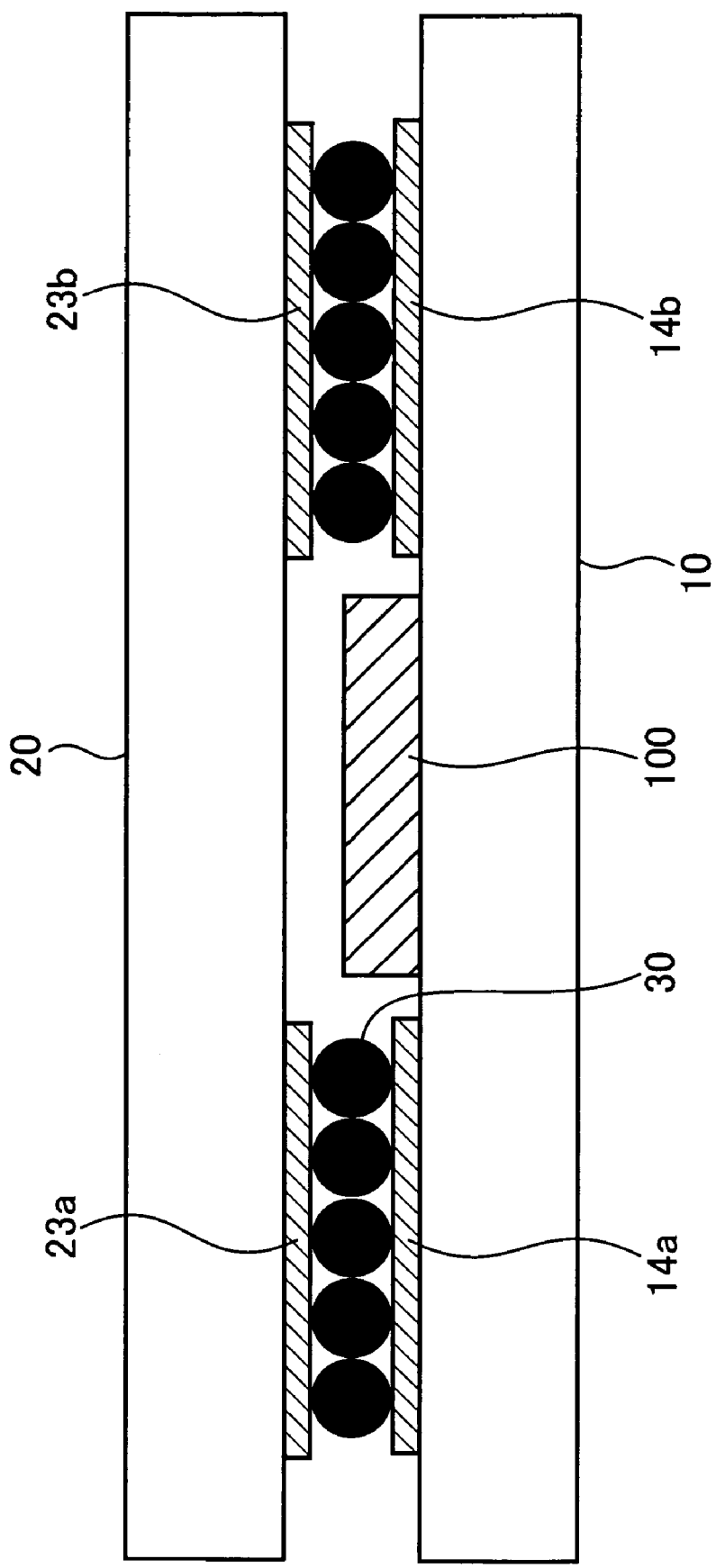
FIG. 13 is a diagram schematically illustrating electrode-connection portions in an example of an arrangement in which an optical deflection element is mounted by depositing globular elastic particles on electrode portions of a waveguide substrate.

FIG. 13 is a diagram schematically illustrating electrode-connection portions in an example of an arrangement in which an optical deflection element is mounted by depositing globular elastic particles on electrode portions of a waveguide substrate. In this example, a step structure is realized by forming a protrusion 100 on the upper surface of the waveguide substrate 10 between the electrodes 14a and 14b. The protrusion 100 is made of an insulating material such as a photosensitive polymer, a photosensitive resin, or $SiO_2$, and the height of the protrusion 100 above the surface of the waveguide substrate 10 is smaller than the diameter of the globular elastic particles 30. When the above step structure is formed, movement, in the horizontal direction, of the globular elastic particles 30 distributed on the electrodes 14a and 14b is restricted, so that substantially the globular elastic particles 30 distributed on the electrodes 14a and 14b stay on the electrodes 14a and 14b. Therefore, electric connections between the opposite electrodes 14a and 23a and between the opposite electrodes 14b and 23b can be realized with higher reliability. In addition, the above step structure prevents occurrence of a short circuit between the electrodes 14a and 14b or between the prismatic electrodes 23a and 23b.

Figure 14:
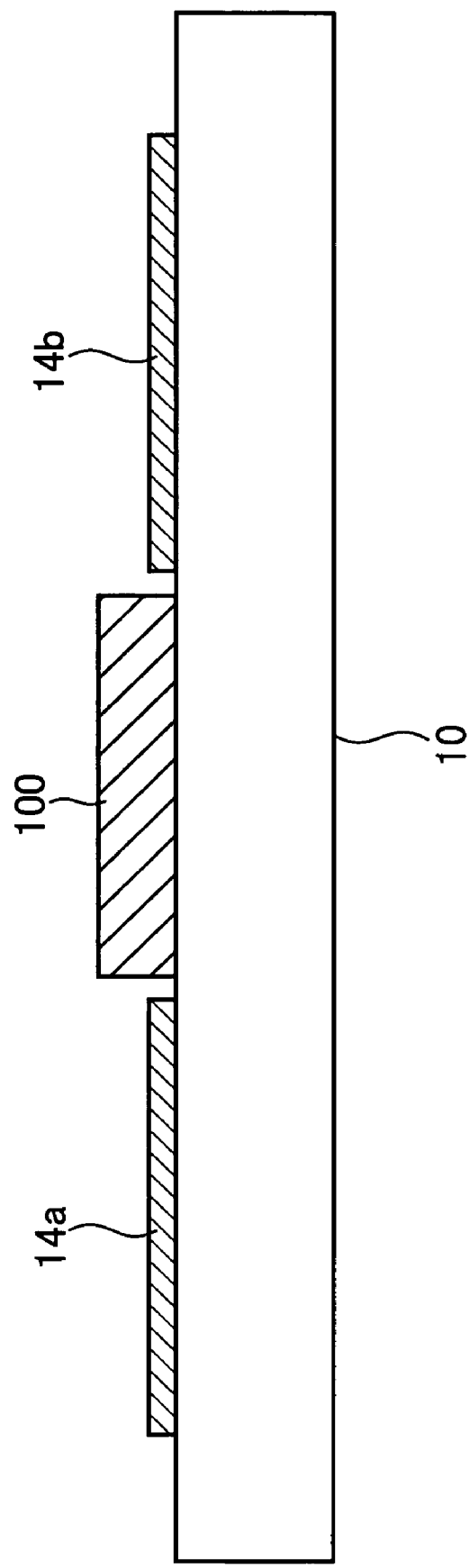
FIG. 14 is a diagram schematically illustrating an essential part of the waveguide substrate, and is provided for explaining a process of forming a step structure.

Hereinbelow, a method for depositing the globular elastic particles 30 by utilizing the step structure is explained with reference to FIGS. 14 to 16, which are diagrams schematically illustrating an essential part of the waveguide substrate 10. FIG. 14 is provided for explaining a process of forming the step structure, FIG. 15 is provided for showing globular elastic particles distributed on the waveguide substrate, and FIG. 16 is provided for explaining a process of removing unnecessary globular elastic particles.

First, for example, a photosensitive polyimide is applied to the upper surface of the waveguide substrate 10 by the spin coating process. In this case, for example, when the diameter of the actually used globular elastic particles 30 is about 10 micrometers, the photosensitive polyimide is applied so that a film having a thickness of about 7 micrometers is formed on the waveguide substrate 10. Then, the photosensitive polyimide is exposed by using a photomask based on such a pattern that the photosensitive polyimide remains in only the gap between the electrodes 14a and 14b, and the protrusion 100 as illustrated in FIG. 14 is formed. Although, in the above example, the height of the protrusion 100 is determined to be about 7 micrometers, which is smaller than the diameter of the globular elastic particles 30, it is possible to arbitrarily change the height of the protrusion 100. However, in order to restrict the movement of the globular elastic particles 30 in the horizontal direction, it is preferable to form the protrusion 100 so as to have a height greater than about half the diameter of the actually used globular elastic particles 30.

After the protrusion 100 is formed, the globular elastic particles 30 are distributed on the waveguide substrate 10 by simply scattering the globular elastic particles 30 on the waveguide substrate 10, or applying ethanol containing the globular elastic particles 30 to the waveguide substrate 10. Since the step structure is formed with the protrusion 100 on the waveguide substrate 10, the globular elastic particles 30 are concentratedly deposited on the electrodes 14a and 14b, and do not freely roll away from the upper surfaces of the electrodes 14a and 14b.

Figure 15:
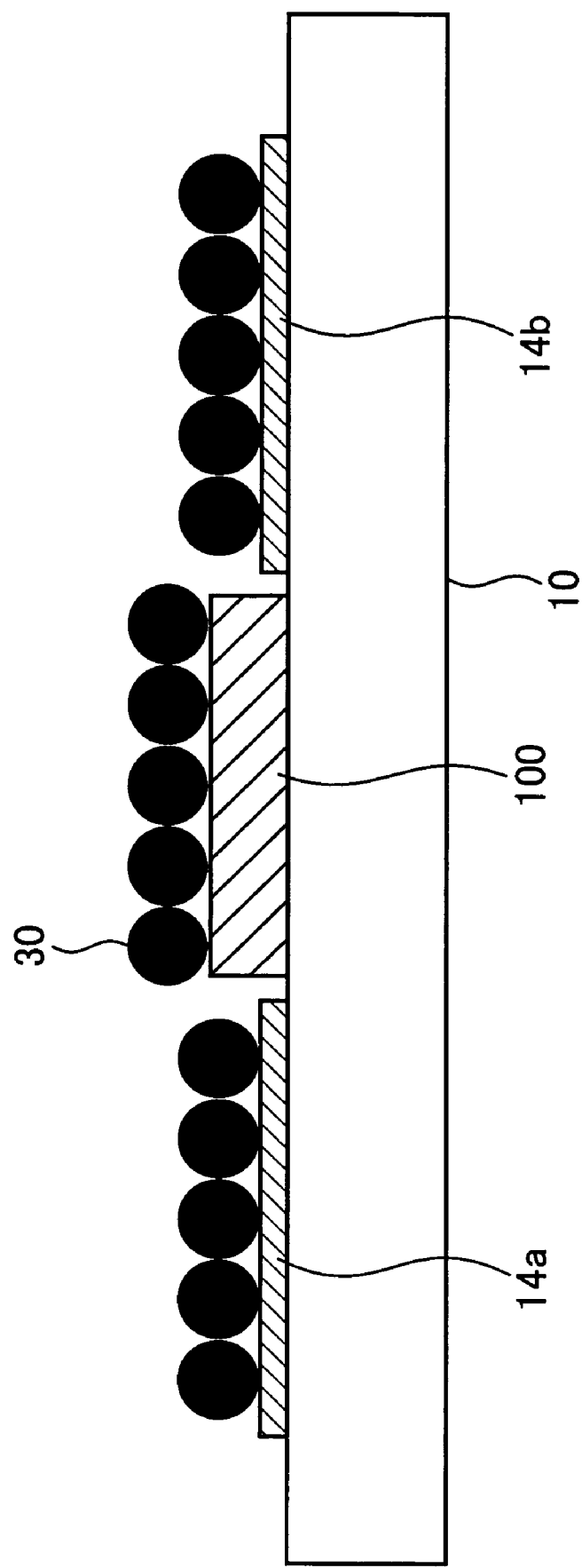
FIG. 15 is a diagram schematically illustrating an essential part of the waveguide substrate, and showing globular elastic particles distributed on the waveguide substrate.
Figure 16:
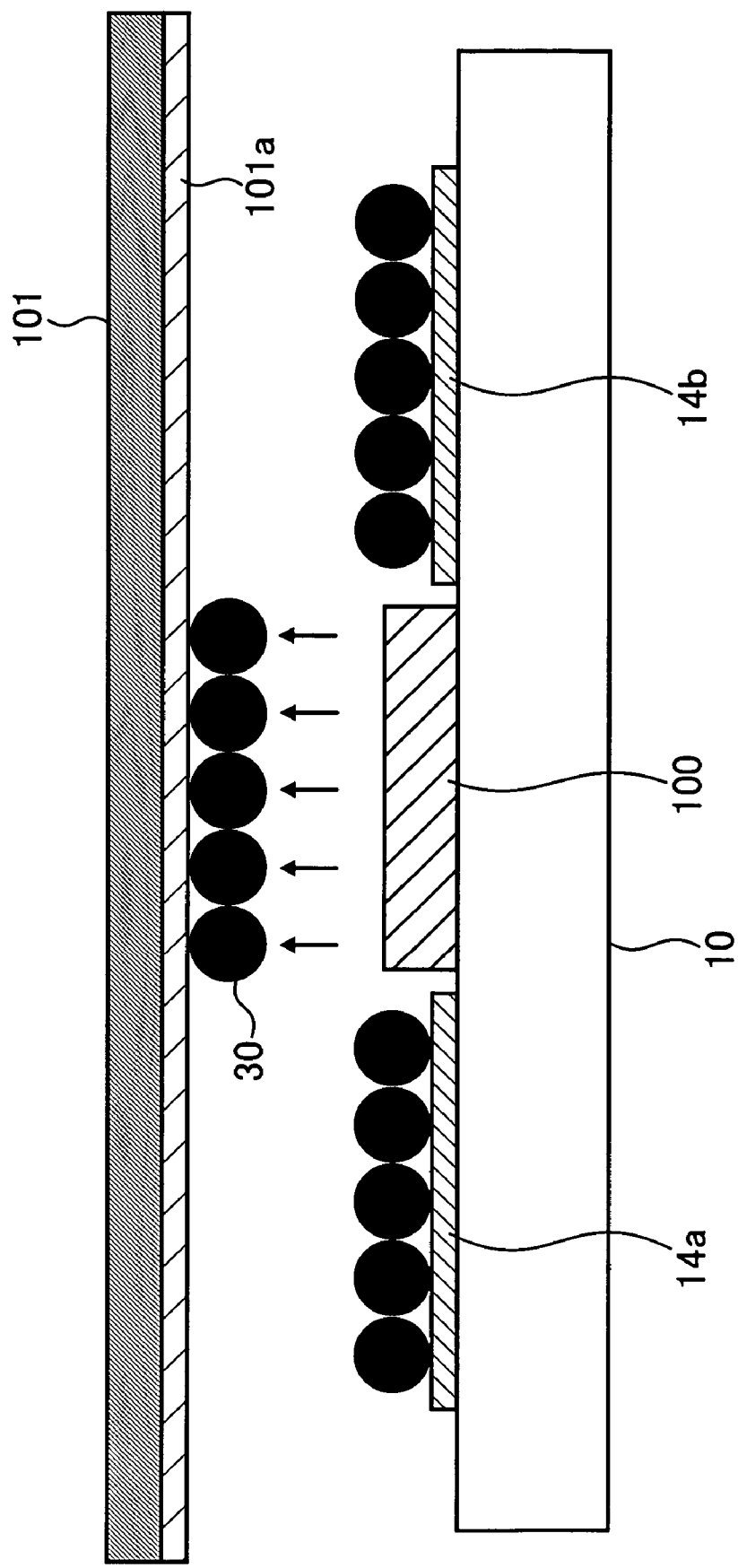
FIG. 16 is a diagram schematically illustrating an essential part of the waveguide substrate, and is provided for explaining a process of removing unnecessary globular elastic particles.

However, a portion of the globular elastic particles 30 may stay on the top of the protrusion 100 as illustrated in FIG. 15. Therefore, in order to deposit the globular elastic particles 30 on only the electrodes 14a and 14b, it is preferable to remove the globular elastic particles located on the top of the protrusion 100 by using an adhesive element 101 which has an adhesive surface 101a, as illustrated in FIG. 16. In this case, when the diameter of the globular elastic particles 30 is about 10 micrometers, the adhesive element 101 is brought down to the height of, for example, about 15 micrometers above the upper surface of the protrusion 100, and is then lifted up. Thus, globular elastic particles located on the electrodes 14a and 14b do not stick to the adhesive surface 101a, and only unnecessary globular elastic particles which are located on the protrusion 100 and do not contribute to the electric connections stick to the adhesive surface 101a and removed from the waveguide substrate 10. Alternatively, it is possible to remove the globular elastic particles from the upper surface of the protrusion 100 by vibrating the waveguide substrate 10 after the globular elastic particles 30 are scattered on the waveguide substrate 10, or ethanol containing the globular elastic particles 30 is applied to the waveguide substrate 10 and the ethanol is evaporated.

After the unnecessary globular elastic particles on the protrusion 100 are removed, the optical deflection element 20 illustrated in FIG. 13 is brought down toward the waveguide substrate 10 until the prismatic electrodes 23a and 23b comes into contact with the globular elastic particles 30. Then, the optical deflection element 20 is pressed and the alignment is adjusted by using the aforementioned adjustment jig 60 or a flip-chip bonder while keeping the prismatic electrodes 23a and 23b in contact with the globular elastic particles 30. Finally, the optical deflection element 20 is fixed to the waveguide substrate 10 with an optical adhesive of a thermosetting or ultraviolet-curing type as illustrated in FIG. 6 so as to maintain the arrangement in which the alignment is adjusted. As mentioned before, the injection of the optical adhesive may be performed in a single step. As a first alternative, it is possible to put an optical adhesive on the waveguide substrate 10 after the distribution of the globular elastic particles 30 before mounting of the optical deflection element 20 on the waveguide substrate 10, and thereafter fix the optical deflection element 20 to the waveguide substrate 10.

Figure 17:
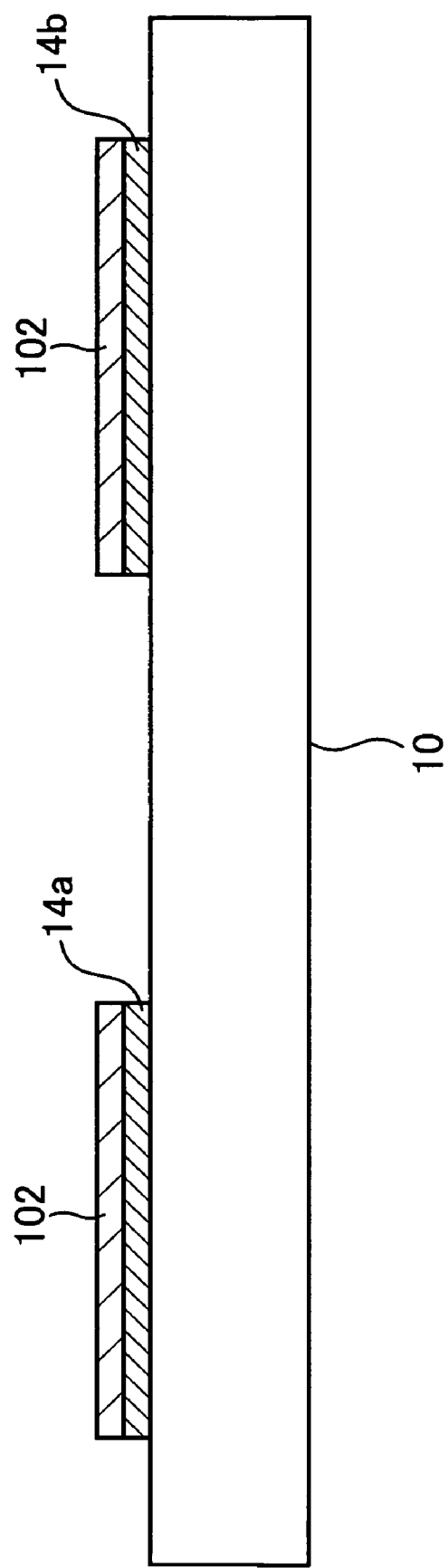
FIG. 17 is a diagram schematically illustrating an essential part of the waveguide substrate, and is provided for explaining a process of applying an adhesive to electrodes.

In addition, as a second alternative, it is possible to deposit the globular elastic particles 30 on the electrodes 14a and 14b by applying an adhesive on the electrodes 14a and 14b in advance, and then sticking the globular elastic particles 30 to the electrodes 14a and 14b. Hereinbelow, a method for depositing the globular elastic particles 30 on the electrodes 14a and 14b by applying an adhesive to the electrodes 14a and 14b is explained with reference to FIGS. 17 to 20, which are diagrams schematically illustrating an essential part of the waveguide substrate 10. FIG. 17 is provided for explaining a process of applying an adhesive to the electrodes, FIG. 18 is provided for explaining a process of making globular elastic particles stick to the electrodes, FIG. 19 is provided for explaining a process of removing globular elastic particles which are not stuck to the electrodes, and FIG. 20 is provided for explaining a process of mounting an optical deflection element through the globular elastic particles stuck to the electrodes.

First, as illustrated in FIG. 17, an adhesive 102 is applied to the electrodes 14a and 14b so as to form a thin film on each of the electrodes 14a and 14b. For example, it is possible to apply the adhesive 102 by using the screen printing technique with a metal mask.

Figure 18:
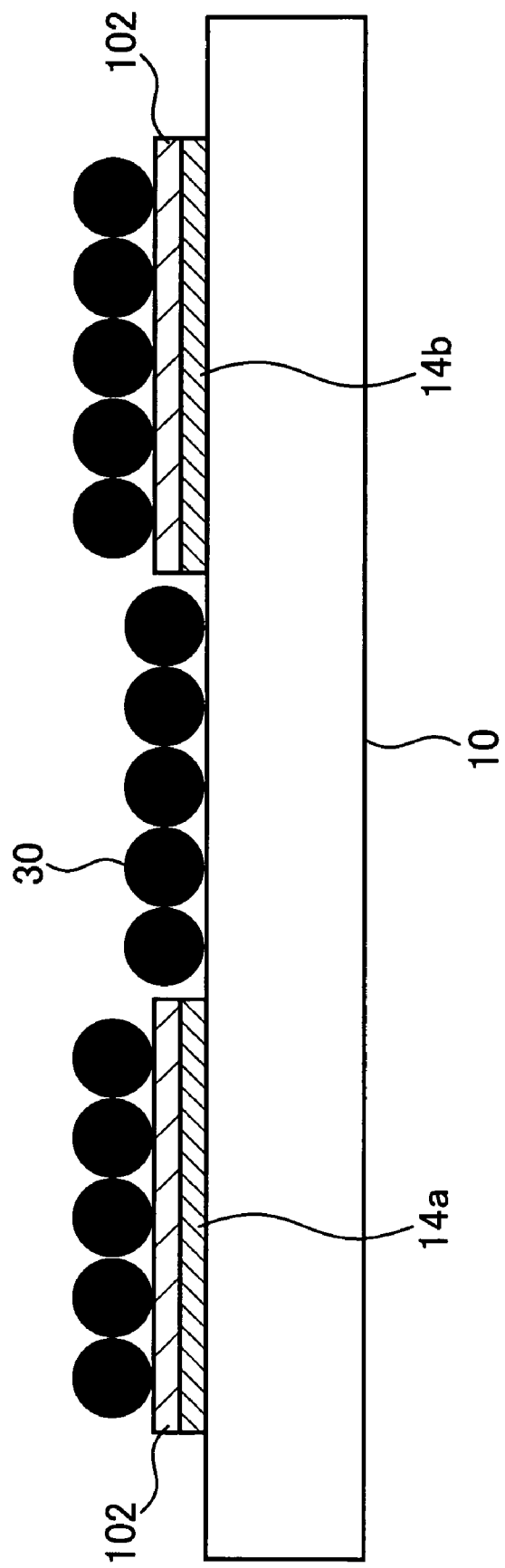
FIG. 18 is a diagram schematically illustrating an essential part of the waveguide substrate, and is provided for explaining a process of making globular elastic particles stick to the electrodes.
Figure 19:
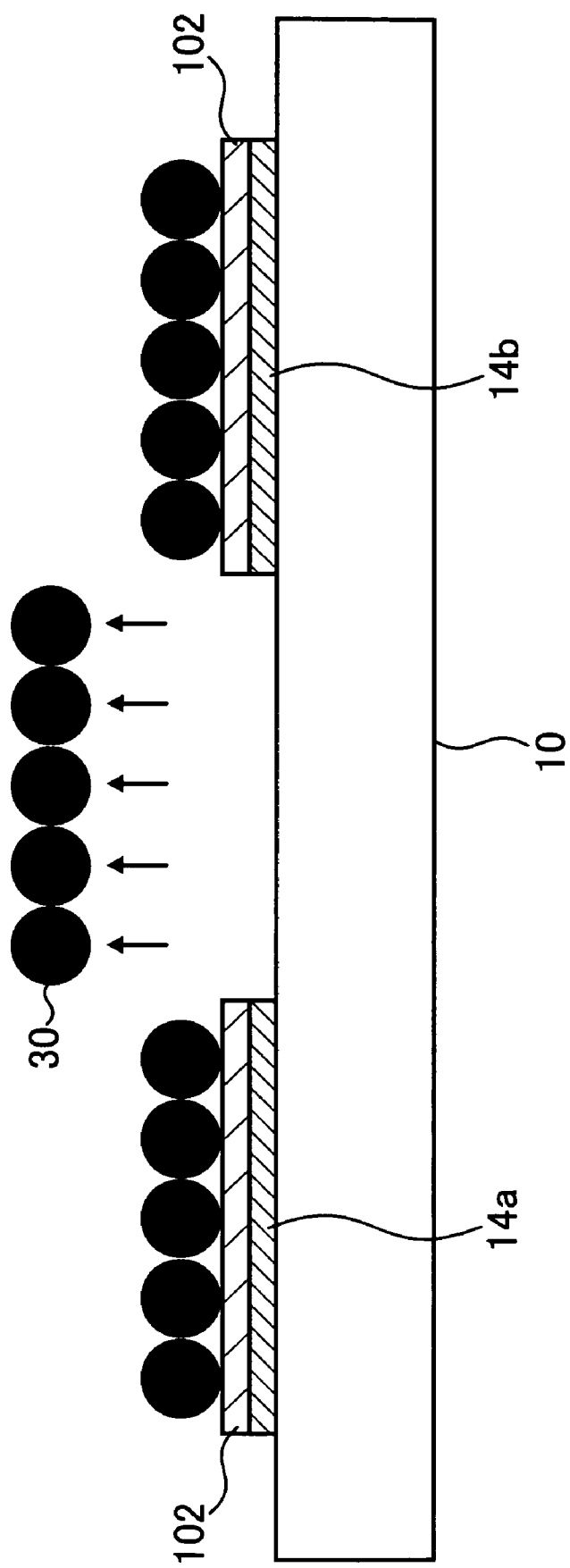
FIG. 19 is a diagram schematically illustrating an essential part of the waveguide substrate, and is provided for explaining a process of removing globular elastic particles which are not stuck to the electrodes.

Next, the globular elastic particles 30 are distributed on the waveguide substrate 10 as illustrated in FIG. 18 by simply scattering the globular elastic particles 30 on the waveguide substrate 10 or passing the waveguide substrate 10 through a space in which the globular elastic particles 30 are suspended. Thus, globular elastic particles distributed on the electrodes 14a and 14b stick to the adhesive 102 on the electrodes 14a and 14b. The other globular elastic particles which do not stick to the adhesive 102 are removed from the waveguide substrate 10 as illustrated in FIG. 19 by an appropriate means, e.g., by vibrating the waveguide substrate 10, blowing air on the waveguide substrate 10, or turning the waveguide substrate 10 upside down.

Figure 20:
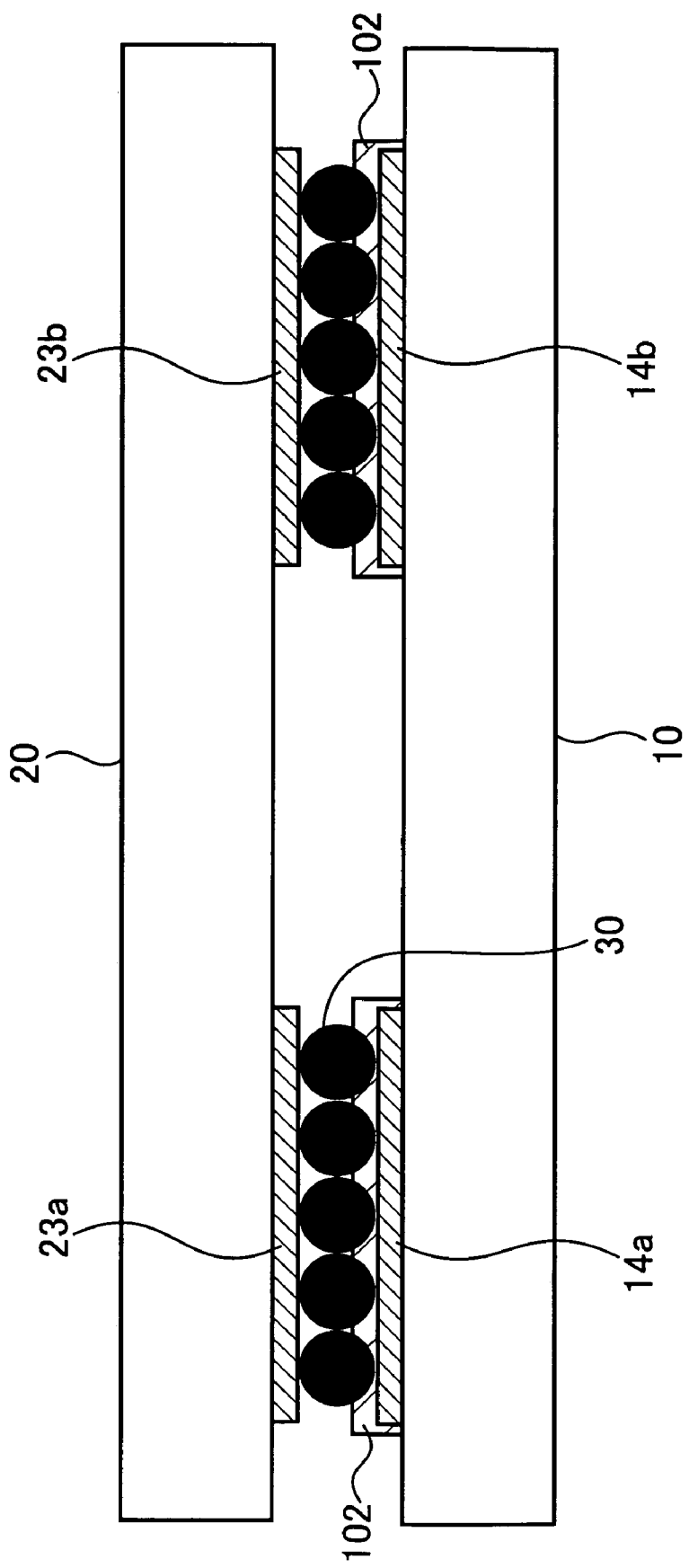
FIG. 20 is a diagram schematically illustrating an essential part of the optical module, and is provided for explaining a process of mounting an optical deflection element through the globular elastic particles stuck to the electrodes.

Thereafter, as illustrated in FIG. 20, the optical deflection element 20 is brought down toward the waveguide substrate 10, and pressed so as to adjust the alignment while keeping the prismatic electrodes 23a and 23b in contact with the globular elastic particles 30, and then the arrangement in which the alignment is adjusted is maintained. Through these operations, the globular elastic particles 30 are pressed by the prismatic electrodes 23a and 23b, and push the adhesive 102 out of the way, so that the globular elastic particles 30 come into contact with the electrodes 14a and 14b. Finally, an optical adhesive is injected into the gaps between the optical deflection element 20 and the waveguide substrate 10, and is then cured. Thus, the optical deflection element 20 is fixed to the waveguide substrate 10 in an arrangement in which electric connections between the opposite electrodes 14a and 23a and between the opposite electrodes 14b and 23b are realized. The injection of the optical adhesive may be performed in either one or two steps. Alternatively, it is possible to put the optical adhesive on the waveguide substrate 10 after the distribution of the globular elastic particles 30 before mounting of the optical deflection element 20 on the waveguide substrate 10, and thereafter fix the optical deflection element 20 to the waveguide substrate 10.

As explained above, since the globular elastic particles 30 are concentratedly deposited on the electrodes 14a and 14b on the waveguide substrate 10, it is possible to mount the optical deflection element 20 on the waveguide substrate 10 without occurrence of a short circuit or poor connection. However, it is not necessary that the globular elastic particles 30 are strictly confined on the upper surfaces of the electrodes 14a and 14b. In the case where the aforementioned protrusion 100 is formed, and the electrodes 14a and 14b are insulated from each other by the step structure formed of an insulating material, the globular elastic particles 30 may also be distributed in the vicinity of each of the electrodes 14a and 14b as well as on the electrodes 14a and 14b. In addition, the adhesive 102 may also be applied to the vicinity of each of the electrodes 14a and 14b as well as the upper surfaces of the electrodes 14a and 14b, as long as the area of the adhesive 102 extending on and around the electrode 14a and the area of the adhesive 102 extending on and around the electrode 14b are separated from each other, and no globular elastic particle stuck to the adhesive 102 extending on and around the electrode 14a is in contact with a globular elastic particle stuck to the adhesive 102 extending on and around the electrode 14b.

Alternatively, in order to distribute the globular elastic particles 30 on the waveguide substrate 10, it is possible to mix the globular elastic particles 30 into an optical adhesive, and apply the mixture to the waveguide substrate 10, instead of simply scattering the globular elastic particles 30 on the waveguide substrate 10, or applying to the waveguide substrate 10 a volatile agent containing the globular elastic particles 30. In the case where a mixture of the optical adhesive and the globular elastic particles 30 is applied to the waveguide substrate 10, it is possible to apply the mixture to the waveguide substrate 10 before mounting the optical deflection element 20, and thereafter fix the optical deflection element 20 to the optical deflection element 20 in an arrangement in which the adjustment is achieved by pressing the optical deflection element 20. In this case, globular elastic particles deposited between the electrodes 14a and 14b and the respectively corresponding prismatic electrodes 23a and 23b contribute to electric connections.

Figure 21:
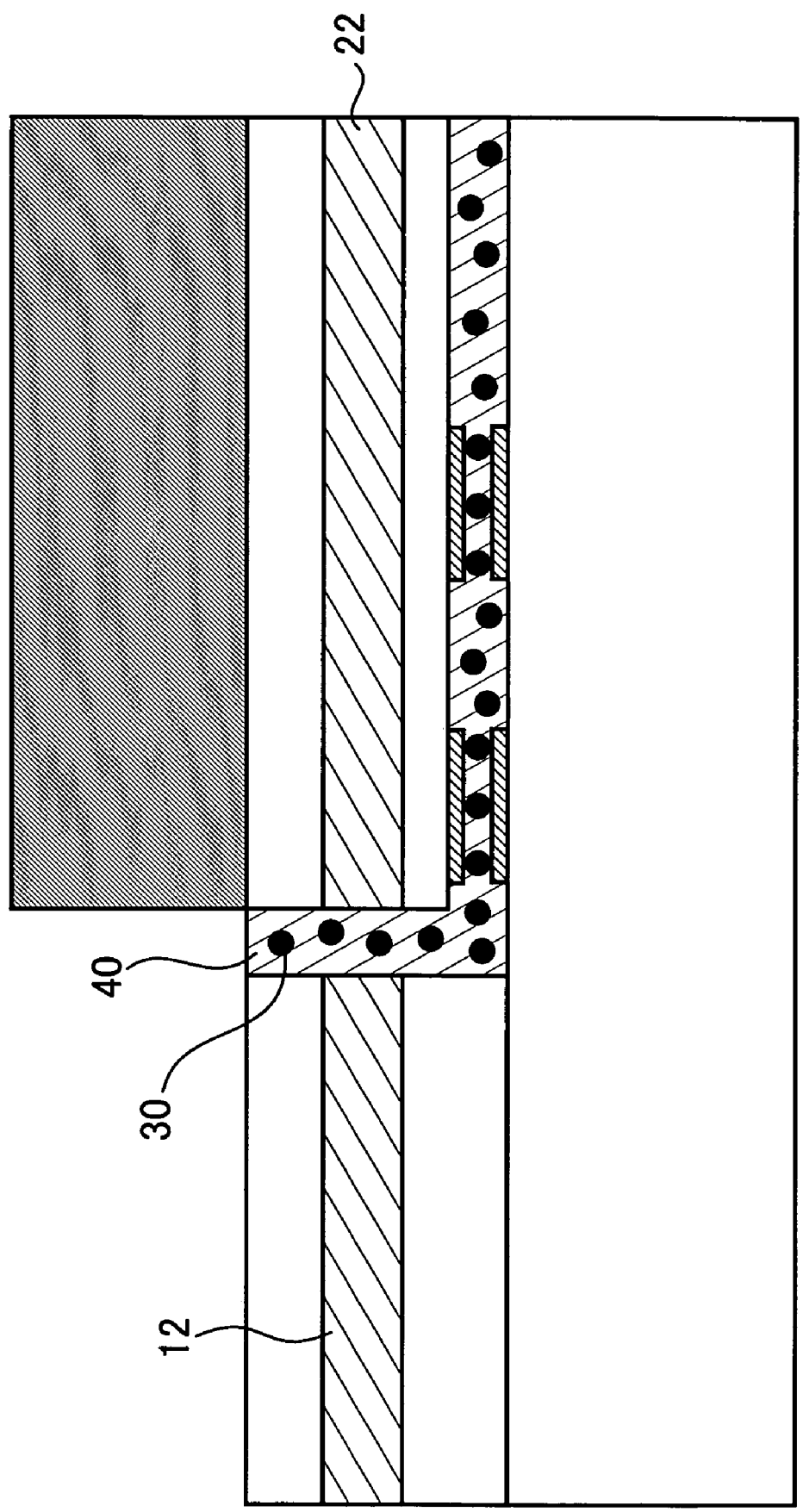
FIG. 21 is a diagram schematically illustrating an arrangement in which an optical deflection element is mounted, and is provided for explaining a problem which can occur in the case where an optical adhesive containing globular elastic particles is used.

However, as explained before with reference to FIGS. 10 and 11, a short circuit can occur when the amount of the globular elastic particles 30 contained in the optical adhesive is too great, and a poor connection can occur when the amount of the globular elastic particles 30 contained in the optical adhesive is too small. FIG. 21 is a diagram schematically illustrating an arrangement in which the optical deflection element is mounted, and is provided for explaining a problem which can occur in the case where an optical adhesive containing globular elastic particles is used. When an optical adhesive 40 containing the globular elastic particles 30 is used, globular elastic particles which are located apart from the electrodes and do not contribute to electric connections may block the optical path between the optical waveguide 22 and an optical waveguide 12 as illustrated in FIG. 21.

Figure 22:
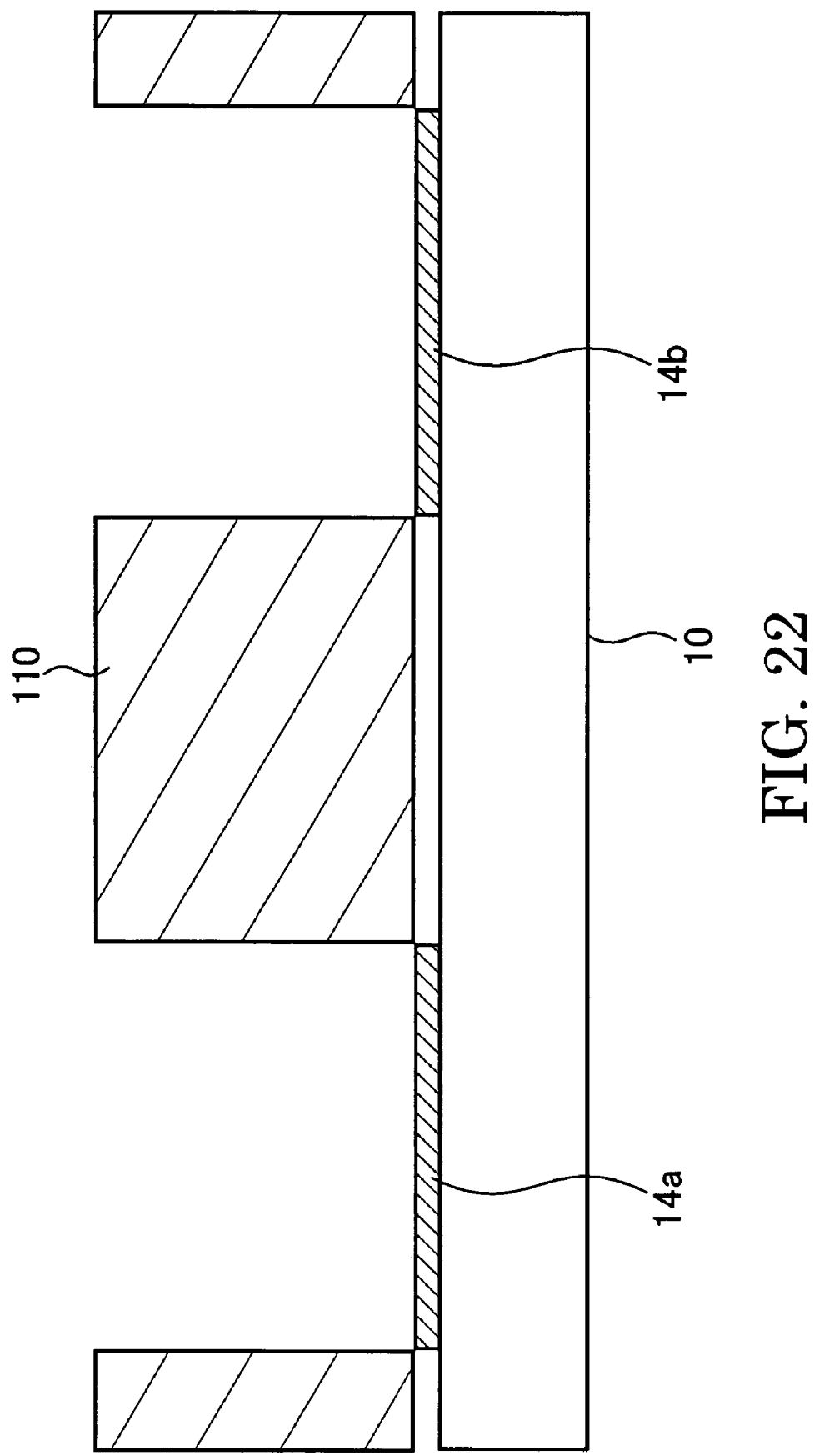
FIG. 22 is a diagram schematically illustrating an essential part of the waveguide substrate, and is provided for explaining a process of forming a mask.

Even in the case where an adhesive containing the globular elastic particles 30 is used, it is possible to concentratedly deposit the globular elastic particles 30 on the electrode portions. Hereinbelow, a method for depositing the globular elastic particles 30 by using an adhesive containing the globular elastic particles 30 is explained with reference to FIGS. 22 to 26, which are diagrams schematically illustrating an essential part of the waveguide substrate 10. FIG. 22 is provided for explaining a process of forming a mask, FIG. 23 is provided for explaining a process of applying a first adhesive, FIG. 24 is provided for explaining a process of removing a mask, FIG. 25 is provided for explaining a process of applying a second adhesive, and FIG. 26 is provided for explaining a process of mounting an optical deflection element in the case where an optical adhesive containing globular elastic particles is used.

First, as illustrated in FIG. 22, areas of the waveguide substrate 10 except for the electrodes 14a and 14b are protected with a mask 110. For example, the mask 110 may be a metal mask or a mesh mask.

Figure 23:
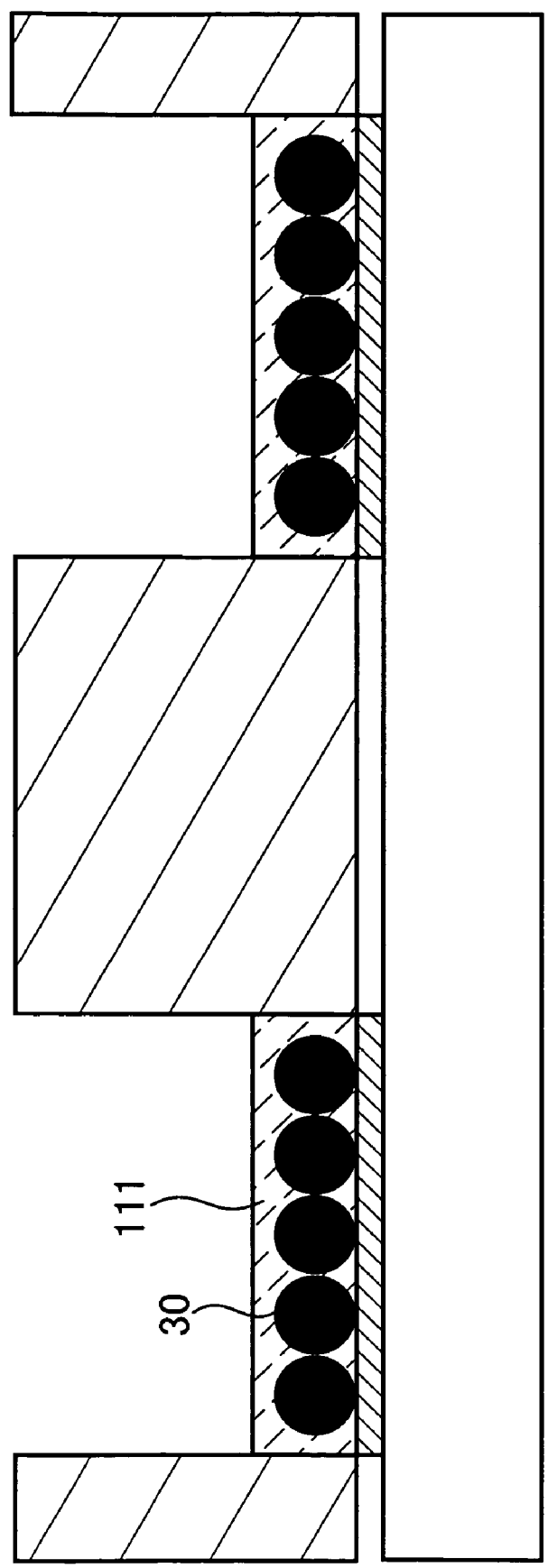
FIG. 23 is a diagram schematically illustrating an essential part of the waveguide substrate, and is provided for explaining a process of applying a first adhesive.
Figure 24:
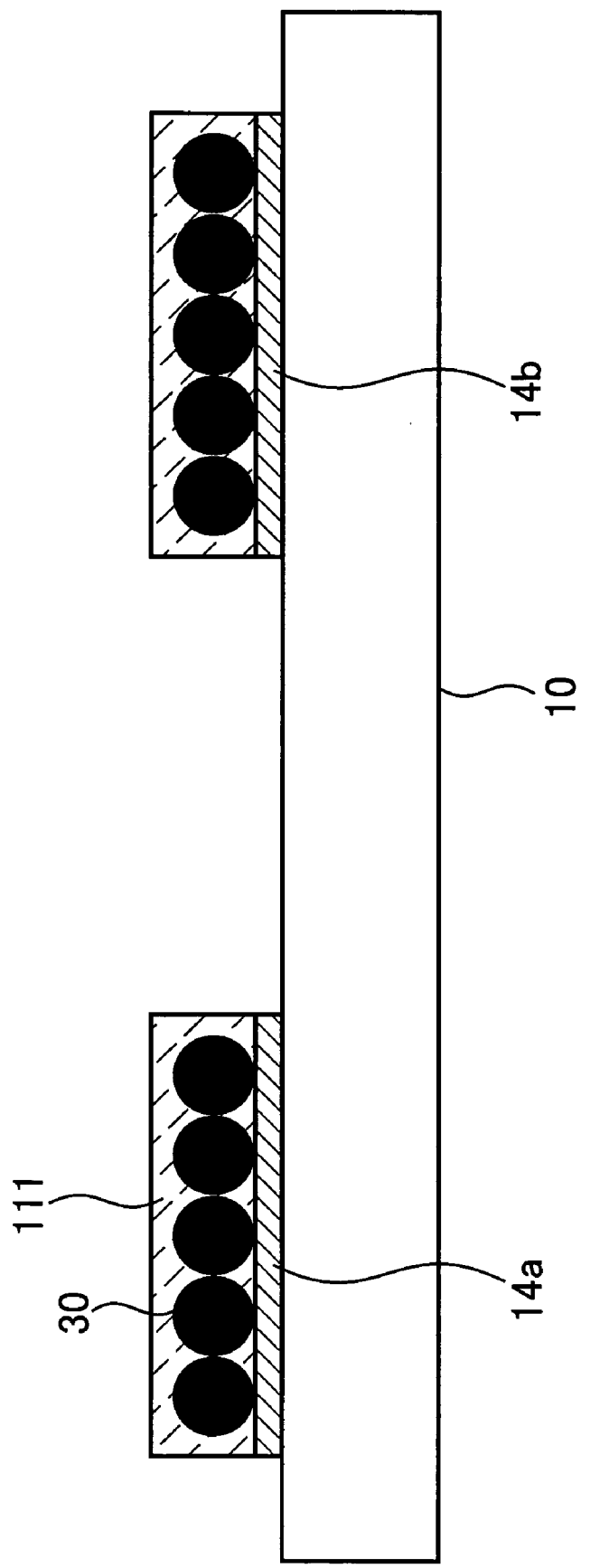
FIG. 24 is a diagram schematically illustrating an essential part of the waveguide substrate, and is provided for explaining a process of removing a mask.

After the mask 110 is formed, a first adhesive 111 containing, for example, about 5 to 20 percent globular elastic particles by volume is applied as illustrated in FIG. 23 by using a screen printing machine. In the first adhesive 111, an epoxy resin of a thermosetting or ultraviolet-curing type can be used, and a predetermined amount of globular elastic particles is mixed into the epoxy resin. After the first adhesive 111 is applied, the mask 110 is exfoliated off as illustrated in FIG. 24. Preferably, the viscosity of the first adhesive 111 is so high that portions of the first adhesive 111 do not flow from the upper surfaces of the electrodes 14a and 14b along the horizontal directions, and do not mix with each other.

Figure 25:
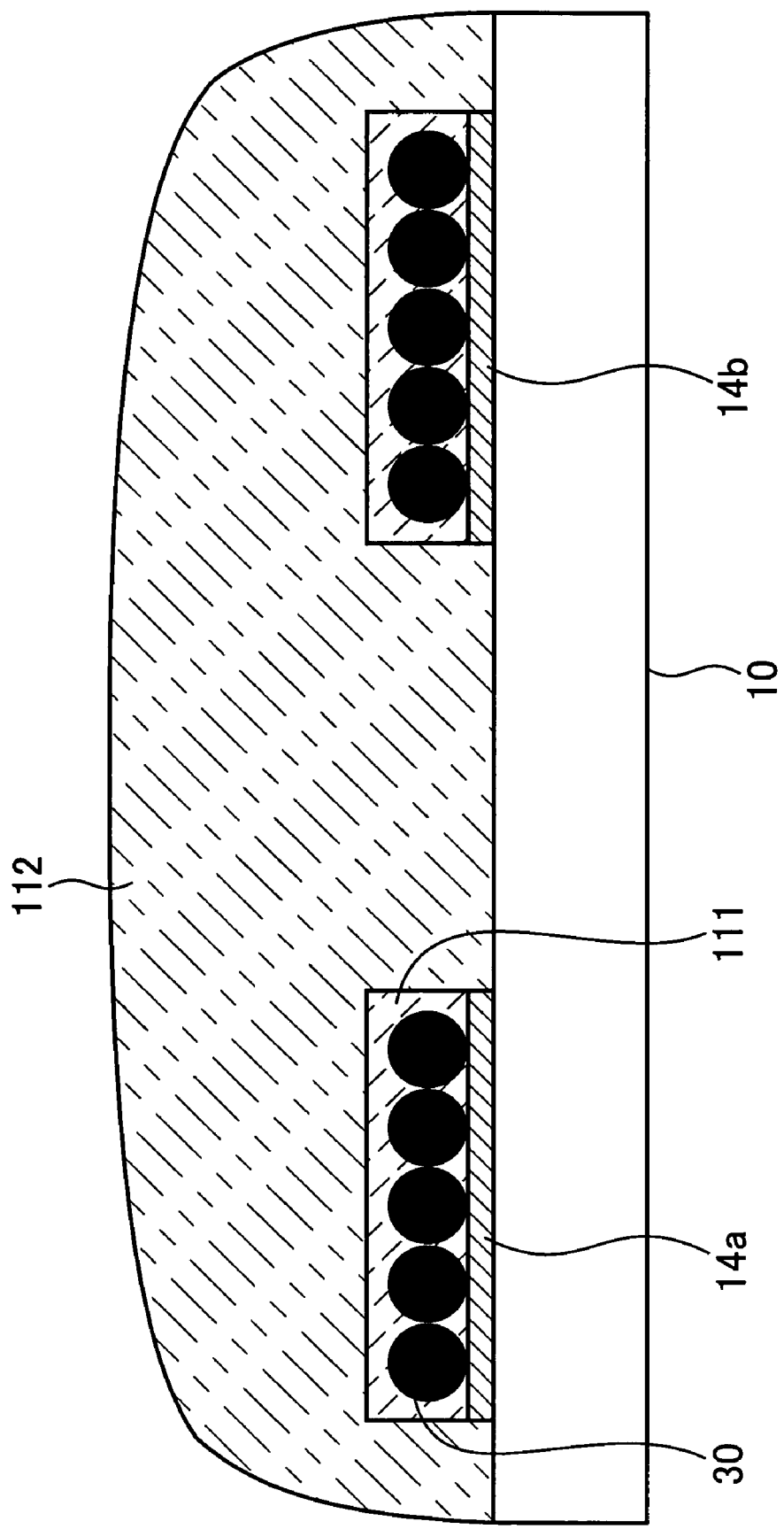
FIG. 25 is a diagram schematically illustrating an essential part of the waveguide substrate, and is provided for explaining a process of applying a second adhesive.
Figure 26:
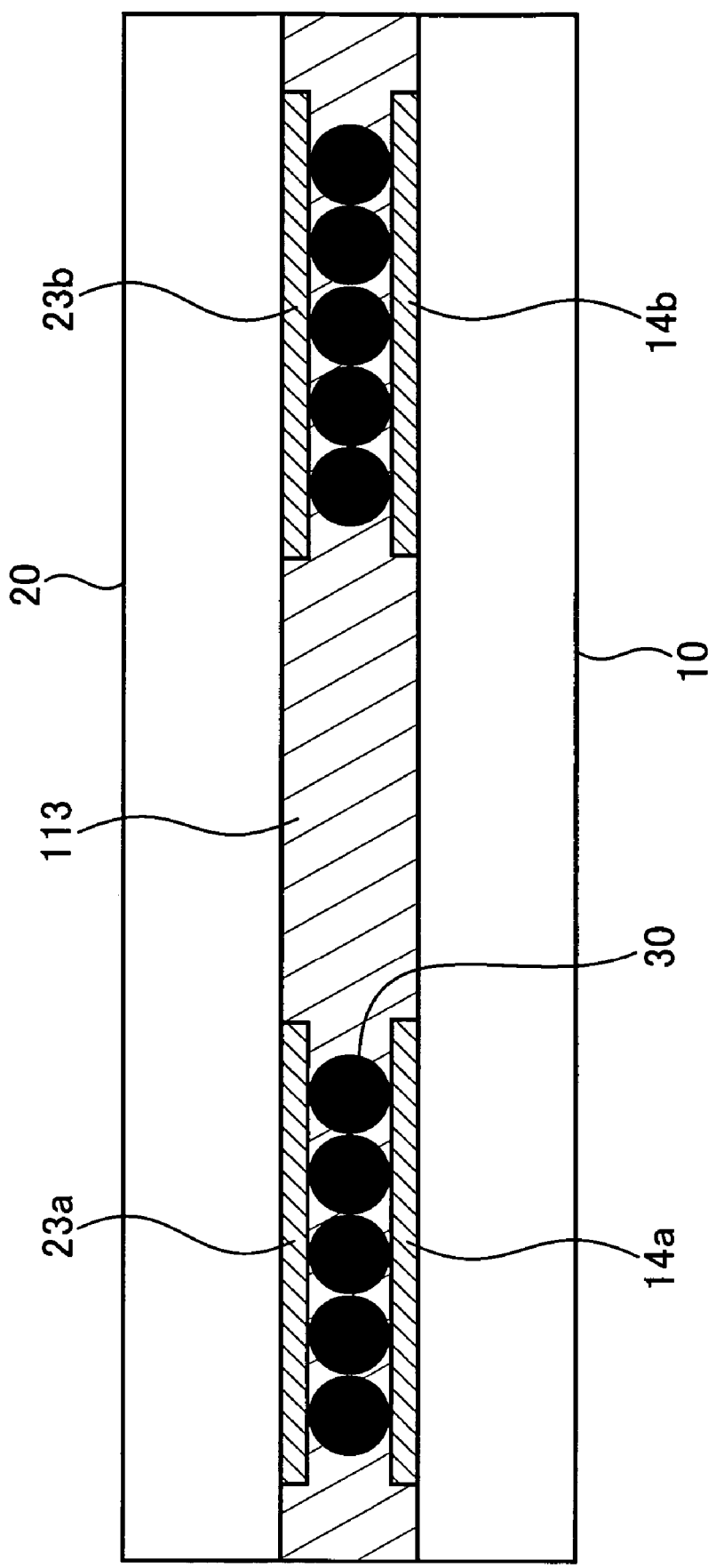
FIG. 26 is a diagram schematically illustrating an essential part of the optical module, and is provided for explaining a process of mounting an optical deflection element in the case where an optical adhesive containing globular elastic particles is used.

Next, a second adhesive 112 is applied to the waveguide substrate 10 as illustrated in FIG. 25. The second adhesive 112 can also be an epoxy resin of a thermosetting or ultraviolet-curing type, and may or may not be identical to the first adhesive 111.

It is preferable that the materials of the first and second adhesives 111 and 112 are determined so that the viscosity $\rho 1$ of the first adhesive 111 and the viscosity $\rho 2$ of the second adhesive 112 satisfy the relationship, $\rho 1 > \rho 2$. For example, the viscosity $\rho 1$ of the first adhesive 111 may be about 2,000 to 5,000 mPa·s, and the viscosity $\rho 2$ of the second adhesive 112 may be about 1,000 mPa·s.

After the second adhesive 112 is applied, the optical deflection element 20 is pressed toward the waveguide substrate 10 by using, for example, a flip-chip bonder or the like. At this time, the electrodes 14a and 23a are connected through a portion of the globular elastic particles 30 to each other, the electrodes 14b and 23b are also connected through a portion of the globular elastic particles 30 to each other, and a superfluous portion of a mixture 113 of the first adhesive 111 and the second adhesive 112 flows out sideways. Then, the optical deflection element 20 is aligned with the waveguide substrate 10. While maintaining the alignment, the optical deflection element 20 is fixed to the waveguide substrate 10 by curing the mixture 113 as follows. That is, when the mixture 113 is composed of one or more thermosetting resins only, the mixture 113 is cured by heating. When the mixture 113 is composed of one or more ultraviolet-curing resins only, the mixture 113 is cured by application of ultraviolet light. In addition, when the first adhesive 111 is a thermosetting resin, and the second adhesive 112 is an ultraviolet-curing resin, it is possible to first cure the first adhesive 111 by heating, and thereafter cure the second adhesive 112 by application of ultraviolet light. When the first adhesive 111 is an ultraviolet-curing resin, and the second adhesive 112 is a thermosetting resin, it is possible to first cure the first adhesive 111 by application of ultraviolet light, and thereafter cure the second adhesive 112 by heating.

In the case where the substrate 11 in the waveguide substrate 10 is made of a transparent material, the ultraviolet light can be applied through the substrate 11. Therefore, in this case, it is preferable that at least one of the first adhesive 111 and the second adhesive 112 is an ultraviolet-curing resin. In this respect, when the substrate 11 is not transparent, it is preferable that at least one of the first adhesive 111 and the second adhesive 112 is a thermosetting resin.

Figure 27:
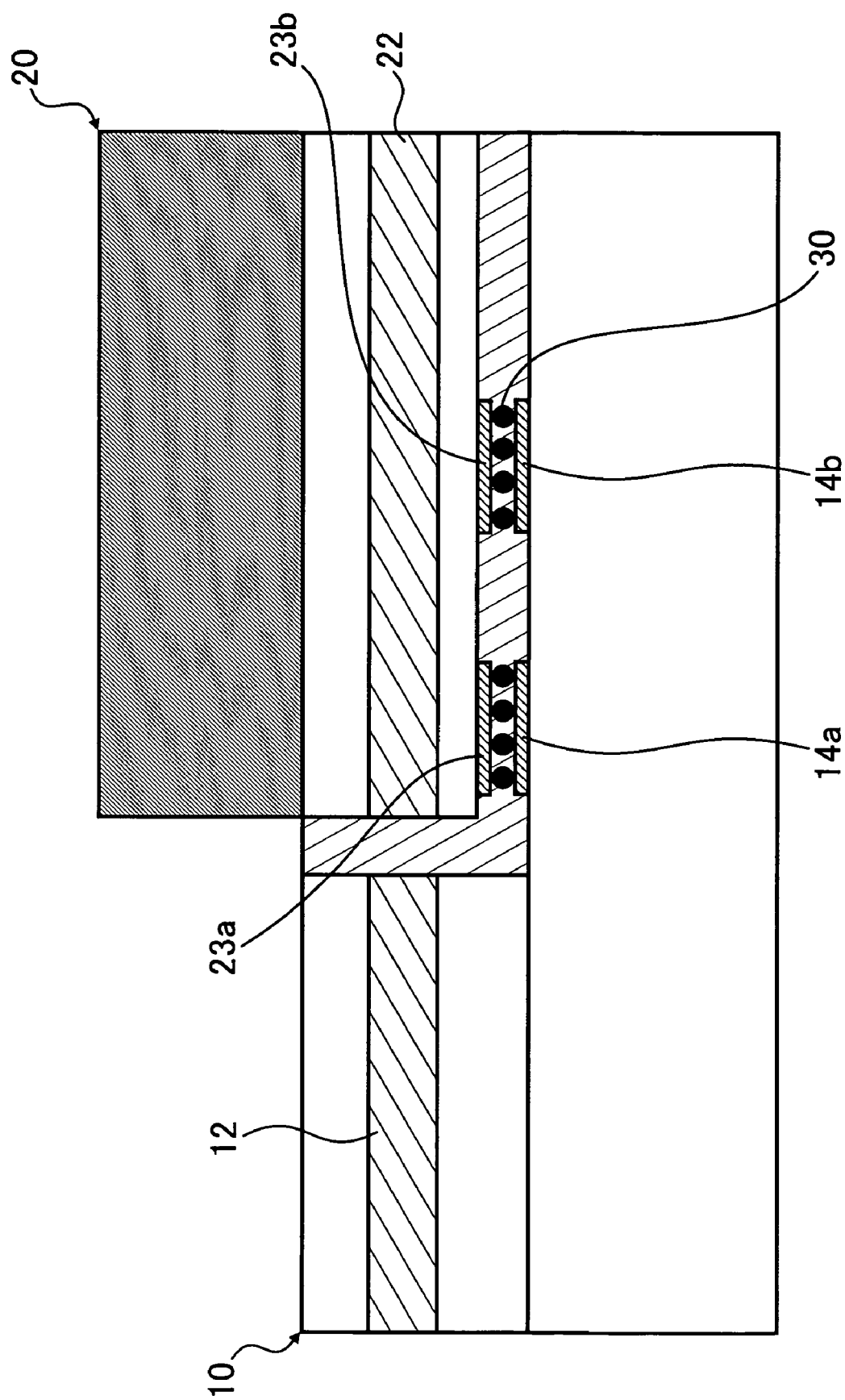
FIG. 27 is a diagram schematically illustrating an arrangement in which an optical deflection element is mounted by using an optical adhesive containing globular elastic particles.

FIG. 27 is a diagram schematically illustrating an arrangement in which an optical deflection element is mounted by using an optical adhesive containing globular elastic particles. According to the above method, it is possible to distribute the globular elastic particles 30 between the electrodes 14a and 14b and the prismatic electrodes 23a and 23b which are respectively located opposite to the electrodes 14a and 14b, and leave no globular elastic particle between the waveguides 12 and 22, as illustrated in FIG. 27. That is, it is possible to prevent blocking of the optical path between the waveguide substrate 10 and the optical deflection element 20 by globular elastic particles which do not contribute to the electric connections. In the case where the mixture 113 remains in the gap between the waveguides in the waveguide substrate 10 and the optical deflection element 20, it is possible to use an optical adhesive in the second adhesive 112. Alternatively, it is possible to use a normal thermosetting or ultraviolet-curing resin as the first adhesive 111 and the second adhesive 112 around the electrodes 14a and 14b, and use an optical adhesive as the first adhesive 111 and the second adhesive 112 in the vicinities of the waveguides.

Further, in order to prevent occurrence of a short circuit which is caused by flowing of portions of the first adhesive 111 from the upper surfaces of the electrodes 14a and 14b along the horizontal directions and mixing of the portions, it is possible to partially cure the first adhesive 111 after the removal of the mask 110 before the application of the second adhesive 112. For example, in the case where a thermosetting resin is used in each of the first adhesive 111 and the second adhesive 112, it is possible to partially cure the first adhesive 111 by heating the first adhesive 111 at an appropriate temperature, and thereafter completely cure the second adhesive 112 by heating the second adhesive 112 at a higher temperature. For example, when the curing temperature of the thermosetting resin is about 160° C., the partial curing can be performed at the temperature of 100 to 120° C., at which the curing of the thermosetting resin begins.

However, the conditions for partially curing a thermosetting resin vary with the type of the resin, the heating time, the atmosphere during the heating process, the size of the globular elastic particles 30, the amount of the contained globular elastic particles 30, and the like. Therefore, when it is necessary to set the conditions for partially curing the thermosetting resin so that portions of the first adhesive 111 do not flow from the upper surfaces of the electrodes 14a and 14b, and do not mix with each other. In addition, it is also necessary to set the conditions for partially curing the thermosetting resin so that the prismatic electrodes 23a and 23b can push the first adhesive 111 out of the way, and come into contact with the globular elastic particles 30 when the optical deflection element 20 is pressed. Further, similarly, in the case where an ultraviolet-curing type adhesive is used, it is also necessary to appropriately set the conditions for partially curing the ultraviolet-curing type adhesive.

Furthermore, it is not necessary that the globular elastic particles 30 contained in the first adhesive 111 are strictly confined on the upper surfaces of the electrodes 14a and 14b, and the first adhesive 111 may also be applied to the vicinities of the electrodes 14a and 14b as well as the upper surfaces of the electrodes 14a and 14b.

As explained above, when the optical deflection element 20 is mounted on the optical deflection element 20, the globular elastic particles 30 are deposited on only the electrodes 14a and 14b on the waveguide substrate 10, or on the electrodes 14a and 14b and in the vicinities of the electrodes 14a and 14b. Therefore, it is possible to mount the optical deflection element 20 on the waveguide substrate 10 so that occurrence of a short circuit or poor connection is prevented with higher reliability, and the optical path is secured. In addition, even when the spacing between adjacent electrodes is small, it is possible to realize electric connections and secure the optical path with higher reliability.

Although, in the examples used in the above explanations on the method for depositing the globular elastic particles 30, the globular elastic particles 30 each have a diameter of about 10 micrometers, the size of the globular elastic particles 30 is not limited to such a value. When the size of the globular elastic particles 30 is changed, it is possible to appropriately change the height of the protrusion 100 formed on the waveguide substrate 10 and the position to which the adhesive element 101 is brought down. In addition, it is also possible to appropriately change the amount of the globular elastic particles 30 contained in the optical adhesive 40 according to the size of the globular elastic particles 30 and the areas of the electrodes 14a and 14b.

For example, the optical module as explained above can be used as an optical switching circuit which switches input/output channels of optical signals. In this case, on the input side of the waveguide substrate 10, input-side channel waveguides corresponding to the number of input channels are respectively connected through input-side collimator lenses, and input-side optical deflection elements corresponding to the number of the input channels are provided. In addition, on the output side of the input-side optical deflection elements, output-side optical deflection elements, output-side collimator lenses, and output-side channel waveguides are arranged through slab waveguides in correspondence with the number of output channels. In this construction, for example, the input-side and output-side channel waveguides, the input-side and output-side collimator lenses, and the slab waveguides between the input-side and output-side optical deflection elements are formed on a substrate which corresponds to the substrate 11 illustrated in FIG. 1, and the input-side and output-side optical deflection elements are mounted on the substrate. In addition, optical signals which enter through the input-side channel waveguides are deflected by the optical deflection elements so that the deflected optical signals propagate to arbitrary output channels, respectively. Therefore, according to the present invention, it is possible to realize a high-performance optical switching circuit in which the amount of attenuation of light which propagates therethrough is small.

Although, in the examples explained above, the optoelectronic component is an optical deflection element, the optoelectronic component is not limited to the optical deflection element. In the optical module according to the present invention, the optoelectronic component may be, for example, a light emitting element using a semiconductor laser or the like, or a light receiving element using a semiconductor photodetector or the like. In these cases, it is possible to finely adjust the height and the mounting angles of the optoelectronic component so that an optical axis of light emitted from the semiconductor laser or an optical axis of light which is incident on a photodetector and maximizes the light reception efficiency in the photodetector precisely coincides with the direction in which light propagates through the optical waveguide on the waveguide substrate.

As explained above, in a method for production of an optical module according to the present invention, an optoelectronic component is mounted in a recessed portion of a waveguide substrate through globular elastic particles. When the optoelectronic component is pressed in this arrangement, the globular elastic particles deform so that the height and the mounting angles of the optoelectronic component can be finely adjusted. In addition, since the globular elastic particles are conductive, and distributed in the recessed portion, corresponding electrodes on the waveguide substrate and the optoelectronic component are electric connected through the globular elastic particles. Therefore, it is possible to make the optical axis of the optoelectronic component precisely coincide with the direction in which light propagates through the optical waveguide on the waveguide substrate, while keeping the corresponding electrodes in contact with each other. Thus, loss in light which propagates through the optical module can be reduced.

As explained above, in the optical module according to the present invention, an optoelectronic component is mounted in a recessed portion of a waveguide substrate through globular elastic particles. When the optoelectronic component is pressed in this arrangement, the globular elastic particles deform so that the height and the mounting angles of the optoelectronic component can be finely adjusted. In addition, since the globular elastic particles are conductive, and distributed in the recessed portion, corresponding electrodes on the waveguide substrate and the optoelectronic component are electric connected through the globular elastic particles. Therefore, the optical axis of the optoelectronic component precisely coincides with the direction in which light propagates through the optical waveguide on the waveguide substrate, while the corresponding electrodes are kept in contact with each other. Thus, loss in light which propagates through the optical module can be reduced.

Further, in the other method for production of an optical module according to the present invention, the globular elastic particles are concentratedly deposited in the electrode portions on the waveguide substrate, it is possible to mount the optoelectronic component on the waveguide substrate so that occurrence of a short circuit or poor connection is prevented with higher reliability, and the optical path is secured.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A method for production of an optical module in which an optoelectronic component having at least one first electrode on a bottom surface of the optoelectronic component is mounted on a waveguide substrate having an optical waveguide, a recessed portion, and at least one second electrode formed on the recessed portion in correspondence with said at least one first electrode, said method comprising the steps of:
    (a) distributing globular elastic conductive particles on a bottom surface of the recessed portion of the waveguide substrate and at least one upper surface of the at least one second electrode;
    (b) placing the optoelectronic component in the recessed portion of the waveguide substrate so that the at least one first electrode is respectively opposed to the at least one second electrode through at least a portion of the globular elastic conductive particles which is located on the at least one upper surface of the at least one second electrode;
    (c) adjusting alignment between the optoelectronic component and the waveguide substrate by pressing the optoelectronic component toward the waveguide substrate so that the at least one first electrode is respectively electrically connected to the at least one second electrode through at least one portion of the globular elastic conductive particles; and
    (d) fixing the optoelectronic component to the waveguide substrate so that the optoelectronic component is aligned with the waveguide substrate.

2. A method according to claim 1, wherein grooves each having a width greater than diameters of the globular elastic conductive particles are arranged in advance at both ends, in a direction in which light propagates through said optical waveguide, of the bottom surface of said recessed portion.

3. A method according to claim 1, wherein the number of said at least one first electrode is more than one, the number of said at least one second electrode is more than one, said globular elastic conductive particles each have a diameter smaller than each of a space between adjacent ones of said at least one first electrode and a space between adjacent ones of said at least one second electrode.

4. A method according to claim 1, wherein each of said globular elastic conductive particles is a globular elastic particle made of an organic material and coated with a conductive metal.

5. A method according to claim 1, wherein said optoelectronic component is fixed to said waveguide substrate with an optical adhesive.

6. A method according to claim 1, wherein said optoelectronic component is an optical deflection element which comprises an optical waveguide formed of a material exhibiting an electro-optic effect, on a conductive substrate, and one or more prismatic electrodes arranged opposite to the substrate across the conductive substrate; and the optical deflection element is fixed to the waveguide substrate so that the one or more prismatic electrodes face toward the bottom surface of the recessed portion, and the optical waveguide in the optical deflection element is aligned with the optical waveguide.

7. An optical module, comprising:
    an optoelectronic component having a first waveguide;
    a waveguide substrate having a second waveguide, the waveguide substrate having a recessed portion for placing said optoelectronic component;
    at least one first electrode arranged on a bottom surface of the recessed portion;
    at least one second electrode arranged on a bottom surface of said optoelectronic component in correspondence with said at least one first electrode; and
    globular elastic conductive particles distributed on the bottom surface of the recessed portion and an upper surface of the at least one first electrode;
    wherein said optoelectronic component is fixed to the waveguide substrate in such a manner that the optoelectronic component presses the globular elastic conductive particles, and
    wherein said first waveguide and said second waveguide are aligned.

8. A method for production of an optical module in which an optoelectronic component having at least one first electrode on a bottom surface of the optoelectronic component is mounted on a waveguide substrate having an optical waveguide and at least one second electrode which is respectively formed in correspondence with said at least one first electrode, said method comprising the steps of:
- (a) concentratedly depositing globular elastic conductive particles on and around the at least one second electrode;
- (b) placing the optoelectronic component on the globular elastic conductive particles so that the at least one first electrode is respectively opposed to the at least one second electrode, and at least one portion of the globular elastic conductive particles is located between the at least one first electrode and the at least one second electrode;
- (c) adjusting alignment between the optoelectronic component and the waveguide substrate by pressing the optoelectronic component toward the waveguide substrate so that the first and second electrodes are electrically connected through at least one portion of the globular elastic conductive particles; and
- (d) fixing the optoelectronic component to the waveguide substrate so that the optoelectronic component is aligned with the waveguide substrate.

9. A method according to claim 8, wherein the number of said at least one second electrode is more than one, and said globular elastic conductive particles are concentratedly deposited on and around said at least one second electrode in step (a) by forming a protrusion between said at least one second electrode on the waveguide substrate, and distributing the globular elastic conductive particles on the waveguide substrate on which the protrusion is formed.

10. A method according to claim 9, wherein in step (a), a portion of the globular elastic conductive particles which remains on said protrusion is removed by using an element having an adhesive surface.

11. A method according to claim 9, wherein said protrusion has a height above an upper surface of the waveguide substrate, and the height is smaller than diameter of each of the globular elastic conductive particles, and greater than half of the diameter of each of the globular elastic conductive particles.

12. A method according to claim 9, wherein said protrusion is made of an insulating material.

13. A method according to claim 8, wherein in step (a), said globular elastic conductive particles are concentratedly deposited on and around the at least one second electrode by applying an adhesive to the at least one second electrode and at least one vicinity of the at least one second electrode, and distributing the globular elastic conductive particles on the waveguide substrate so that the globular elastic conductive particles adhere to the adhesive.

14. A method for production of an optical module in which an optoelectronic component having at least one first electrode on a bottom surface of the optoelectronic component is mounted on a waveguide substrate having an optical waveguide and at least one second electrode which is respectively formed in correspondence with said at least one first electrode, said method comprising the steps of:
- (a) forming a mask which protects the waveguide substrate except for said at least one second electrode and at least one vicinity of the at least one second electrode;
- (b) applying a first adhesive containing globular elastic conductive particles to said waveguide substrate on which said mask is formed;
- (c) removing the mask;
- (d) applying a second adhesive to the waveguide substrate;
- (e) placing the optoelectronic component on the waveguide substrate so that the at least one first electrode is respectively opposed to the at least one second electrode, and at least one portion of the globular elastic conductive particles is located between the first and second electrodes;
- (f) adjusting alignment between the optoelectronic component and the waveguide substrate by pressing the optoelectronic component toward the waveguide substrate so that the first and second electrodes are electrically connected through at least one portion of the globular elastic conductive particles; and
- (g) fixing the optoelectronic component to the waveguide substrate by curing the first and second adhesives so that the optoelectronic component is aligned with the waveguide substrate.

15. A method according to claim 14, wherein said first adhesive has a first viscosity which is equal to or greater than a second viscosity which said second adhesive has.

16. A method according to claim 14, further comprising, after step (c), a step of (c1) partially curing said first adhesive, wherein said second adhesive is applied, in step (d), to the waveguide substrate on which the first adhesive is partially cured.

17. A method according to claim 14, wherein said first adhesive is made of a thermosetting resin, and said second adhesive is made of an ultraviolet-curing resin.

18. A method according to claim 14, wherein said first adhesive is made of an ultraviolet-curing resin, and said second adhesive is made of a thermosetting resin.

19. A method according to claim 14, wherein said first and second adhesives are each made of a thermosetting resin, said method further comprises, after step (c), a step of (c1) partially curing said first adhesive by heating the first adhesive at a first temperature, said second adhesive is applied, in step (d), to the waveguide substrate on which the first adhesive is partially cured, and the first and second adhesives are cured in step (g) by heating the first and second adhesives at a second temperature which is higher than the first temperature.

20. An optical module comprising:
- a waveguide substrate which has at least one first electrode, and in which a first optical waveguide is formed;
- an optoelectronic component which has at least one second electrode and a second optical waveguide; and
- globular elastic conductive particles concentratedly deposited on and around the at least one first electrode of the waveguide substrate;
- wherein the at least one first electrode is respectively electrically connected to the at least one second electrode through the globular elastic conductive particles, and
- wherein said first optical waveguide and said second optical waveguide are aligned.

21. An optical module according to claim 20, wherein the number of said at least one second electrode is more than one, and a protrusion is formed between said at least one first electrode on the waveguide substrate.

22. An optical module according to claim 20, wherein gaps between said waveguide substrate and said optoelectronic component are filled with resins of more than one type each of which have a function of an adhesive.

23. An optical module according to claim 22, wherein portions, of the gaps between said waveguide substrate and said optoelectronic component, in which optical paths between the optoelectronic component and said optical waveguide exist are filled with a resin which has a function of an optical adhesive.

* * * * *